US005950194A

United States Patent [19]

Bennett et al.

[11] Patent Number: 5,950,194

[45] Date of Patent: Sep. 7, 1999

[54] DOWN-LINE TRANSCRIPTION SYSTEM HAVING REAL-TIME GENERATION OF TRANSCRIPT AND SEARCHING THEREOF

[75] Inventors: James D. Bennett, Chicago; Lawrence M. Jarvis, Wheaton, both of Ill.

[73] Assignee: Engate Incorporated, Wheaton, Ill.

[21] Appl. No.: 09/144,591

[22] Filed: Aug. 31, 1998

Related U.S. Application Data

[63] Continuation of application No. 08/877,719, Jun. 23, 1997, which is a continuation of application No. 08/065,132, May 20, 1993, abandoned, which is a continuation-in-part of application No. 08/036,488, Mar. 24, 1993, Pat. No. 5,369,704.

[51] Int. Cl.[6] ...................................................... G06F 17/30

[52] U.S. Cl. .................................. 707/3; 707/6; 704/251; 704/270

[58] Field of Search .................................... 707/1–6, 104; 704/9, 246, 251, 257, 231, 270; 345/329, 338, 339, 348

[56] References Cited

U.S. PATENT DOCUMENTS

| | | | |
|---|---|---|---|
| 4,972,349 | 11/1990 | Kleinberger | 364/900 |
| 5,265,065 | 11/1993 | Turtle | 395/600 |
| 5,278,980 | 1/1994 | Pedersen et al. | 395/600 |
| 5,293,616 | 3/1994 | Flint | 395/600 |
| 5,303,361 | 4/1994 | Colwell et al. | 707/4 |
| 5,375,235 | 12/1994 | Berry et al. | 395/600 |
| 5,392,428 | 2/1995 | Robins | 395/600 |
| 5,557,722 | 9/1996 | DeRose et al. | 707/513 |
| 5,598,557 | 1/1997 | Doner et al. | 707/5 |

OTHER PUBLICATIONS

"Pedigree Retrievers (Insoft Recall Plus, Catalyst Developments Folio Views Text Retrieval Software)," Geoff Einon, PC User, N. 135,. pp. 109–110, Jun. 1990.

*Primary Examiner*—Paul R. Lintz
*Assistant Examiner*—Hosain T. Alam
*Attorney, Agent, or Firm*—Engate Incorporated

[57] ABSTRACT

A context sensitive searching front-end is disclosed for use in a deposition or trial proceeding wherein a computer aided transcription terminal provides real-time transcribed text down-line to attorney terminals. The terminals may thereafter use the transcribed text and any other text currently being displayed to formulate searches with little or no typing interaction required. Other text which may be used as a basis for searching includes communications from other attorney terminals, from artificial intelligence objection messages, and personal notes. Searching may be conducted on natural language or boolean front-ends which provide virtually instant feed-back as to the value of a search formulation before and after any "searching" actually occurs. Graphing of search results, including individual search word contribution, is provided for modification and selection of the documents to be reviewed. Library selection for searching is provided by analyzing the context from which the search originated, and from the actual words selected for searching. A database structure is also disclosed for providing backward referencing into the actual locations of search words without having to search the text files.

21 Claims, 15 Drawing Sheets

301

OFFSET TABLE

| | GRAMMATICAL WORD TYPE | OFFSET |
|---|---|---|
| 305 | legal | 50 |
| 307 | noun | 45 |
| 309 | verb | 40 |
| 311 | adjective | 30 |
| 313 | adverb | 30 |
| 315 | preposition | 20 |
| 317 | pronoun | 10 |
| 319 | conjunction | 10 |
| 321 | article | 10 |

303

EXEMPLARY COMMONALITY SAMPLE OFFSETS

| | DESCRIPTOR | OFFSET |
|---|---|---|
| 323 | extremely uncommon | 50 |
| 325 | very uncommon | 45 |
| 327 | uncommon | 40 |
| 331 | average | 35 |
| 333 | common | 25 |
| 335 | very common | 15 |
| 337 | extremely common | 5 |

FIG. 13

DOWN-LINE TRANSCRIPTION SYSTEM HAVING REAL-TIME GENERATION OF TRANSCRIPT AND SEARCHING THEREOF

CROSS-REFERENCE TO RELATED APPLICATIONS (Claiming Benefit Under 35 U.S.C. 120)

This application is a continuation of application Ser. No. 08/877,719 filed Jun. 23, 1997, now pending, which is a continuation of application Ser. No. 08/065,132 filed May 20, 1993, now abandoned, which is a continuation-in-part of application Ser. No. 08/036,488 filed Mar. 24, 1993, now U.S. Pat. No. 5,369,704 issued Nov. 29, 1994.

INCORPORATION BY REFERENCE

The descriptive matter of application Ser. No. 08/877,719, now pending, application Ser. No. 08/065,132, now abandoned and application Ser. No. 08/036,488, now U.S. Pat. No. 5,369,704, is incorporated herein by reference in its entirety, and is made part of this application.

BACKGROUND OF THE INVENTION

This invention relates to a down-line transcription system used by attorneys for reviewing real-time transcription during a proceeding such as a trial or deposition; and, more particularly, it relates to a method and apparatus for providing context sensitive searching of a current transcript, other case evidence and case law which may be locally or remotely located.

As is well known, legal proceedings such as a deposition or trial involve the participation of, among others, an examining attorney who asks questions and a witness who must answer ("testify") while under oath. These answers ("testimony") are recorded by the court reporter, along with the associated questions and related conversation, in a digitally coded shorthand format using a stenographic recorder. Recent versions of stenographic recorders communicate the digitally coded shorthand to computer aided transcription ("CAT") systems which attempt to automatically transcribe the coded shorthand into the exact text of words spoken. The CAT systems transmit the transcribed exact text along with occasionally interspersed coded shorthand (when automated transcription fails) down-line for real-time viewing by attorneys as well as by other participants involved.

As is also well known, during depositions and trial, attorneys often find it necessary to have immediate full-searching access to various information such as the current transcript, other case evidence and case law. However, because of the current requirement of each searching front-end associated with such information, immediate access often proves impossible, and attorneys are generally forced to forego their needed access. In many cases, this proves to be detrimental.

For example, instead of having immediate access to case law, attorneys are required to log-in to remote databases, and, after entering a series of preliminary library selections, are faced with formulating and typing a search which they hope will locate the desired case law. The formulated search must follow a syntax which is unique to the specific database being searched. In addition, the syntax usually includes a boolean format involving the use of parentheses, boolean "and" and "or" type logical word operators, and a plethora of other specific syntax commands used to limit a given search. The entire process is very time consuming. Furthermore, because the first search formulation often does not yield the desired results, the attorney must reformulate and manually re-enter the reformulated searches several times before locating the desired information.

Additionally, natural language searching front-ends have been added which, in a very complex fashion, attempt to ascertain actual search intent from an attorney's English language search request. Using the natural language front-end, after logging-in to the remote case law database and selecting the appropriate libraries, the attorney formulates a search in the form of a typical English language sentence or sentences. The search is processed in a remote main-frame computing environment, and the case law offering the best fit is delivered to the attorney. Local case law databases are also available but require the same preliminary library selection delays as with remote database searching. In addition, because of the computing power necessary, the natural searching front-end does not run locally. Therefore, for locally stored case law, the problems associated with the use of a boolean front-end must still be faced.

To search case evidence pleading and other work product, the attorney faces similar delays. First, case evidence is usually stored remotely at the attorney's law offices. At best, this information is available via a dial-up communication link. To search the case evidence, the attorney must first selectively access the different databases, word processing, case management, and deposition review software packages which were used to create or store the specific case evidence, pleadings or other work product. Thereafter, the searching front-end associated with the chosen software package requires the attorney to identify the appropriate database and formulate a search using a syntax unique to the chosen software package.

With all of the different searching front-ends, preliminary searching setup requirements, various searching front-end differences and requirements for formulating and typing in a search, searching is generally a time consuming endeavor requiring a great deal of interaction between attorneys, support staff, and search databases. Compounding the problem, if the attorney decides to search for the same information across many databases, individual searches are required for each such database. As a result, when time is of the essence, the attorney usually has no choice but to ignore the impractical possibility of conducting a search. Unfortunately, time is generally always of the essence in the trial or deposition environment, where searching could prove to be of ultimate value.

Moreover, currently available searching front-ends do not provide an attorney with sufficient information about the database being searched to appropriately formulate or modify a search. Boolean type searching front-ends often yields literally hundreds of hits, yet such searching front ends provide the attorney no indication as to how to appropriately alter the search or how to provide a successful search in the first place. Similarly, current natural language front-ends provide no indication of: 1) how effective a search formulation may turn out to be; 2) the computed significance weighting chosen for a given word; or 3) how to change a search to produce better results. As a result, not only do searches require multiple passes, but the attorney is also forced to review documents which have very little chance of yielding the desired search result.

Currently facing the foregoing problems are hundreds of thousands of attorneys in the United States alone. Hence, it would be highly desirable to solve the foregoing variety of problems enumerated in conducting legal proceedings such as a deposition or trial by providing a common searching front-end which provides seasonable response time with minimal attorney interaction.

It is therefore an object of the present invention to provide a method and apparatus which aids the attorney by permitting a common searching front-end which does not require formulation of a search during a trial or deposition.

It is an object of the present invention to provide a method and apparatus which provides searching capability based on contextual text received for other purposes.

It is an additional object of the present invention to provide a method and apparatus which provides for simple search formulations based on manipulation of previously available text received for alternate purposes.

It is an additional object of the present invention to provide a method and apparatus which provides real-time database feed-back regarding the characteristics of a database in view of a potential or current search formulation.

It is another object of the present invention to provide a method and apparatus which aids the attorney by providing a common searching front-end which detects the context of a search without requiring interactive log-in, library selection, or other preliminary searching requirements.

SUMMARY OF THE INVENTION

These and other objects of the present invention are achieved in an attorney terminal for performing database searching. The terminal has a display which can be controlled to display alphabetic and numeric text from a variety of sources, most of which being displayed for non-searching reasons. The terminal selectively responds using a searching front-end to the search based on the displayed non-searching text.

Other objects are also achieved in a attorney terminal wherein the searching front-end evaluates the context of the search to anticipate the appropriate database searching destination. This may include be cues from the setup information, the current state of the deposing environment, and the actual searches terms selected.

Other objects are also achieved in an attorney terminal wherein the searching front-end selectively responds to classify the significance of alphabetic and numeric text provided for non-searching purposes which have been selected for searching. In addition, only the alphabetic and numeric text classified as significant is considered for the searching.

Other objects are also achieved in an attorney terminal having boolean and natural language searching front-ends which provide virtually immediate feedback as to the value of the search. In some cases this may be graphical, in others, merely numerical. The graphical feedback also provides for immediate feedback as to the contribution of individual word(s) in the search.

Other objects and further aspects of the present invention will become apparent in view of the following detailed description and claims with reference to the accompanying drawings.

BRIEF DESCRIPTION OF THE DRAWINGS

FIG. 13 is a diagram illustrating the techniques used to compute the significance number of a given search word for adding in the natural language and boolean search formulations.

DESCRIPTION OF THE PREFERRED EMBODIMENT

Figure 1:
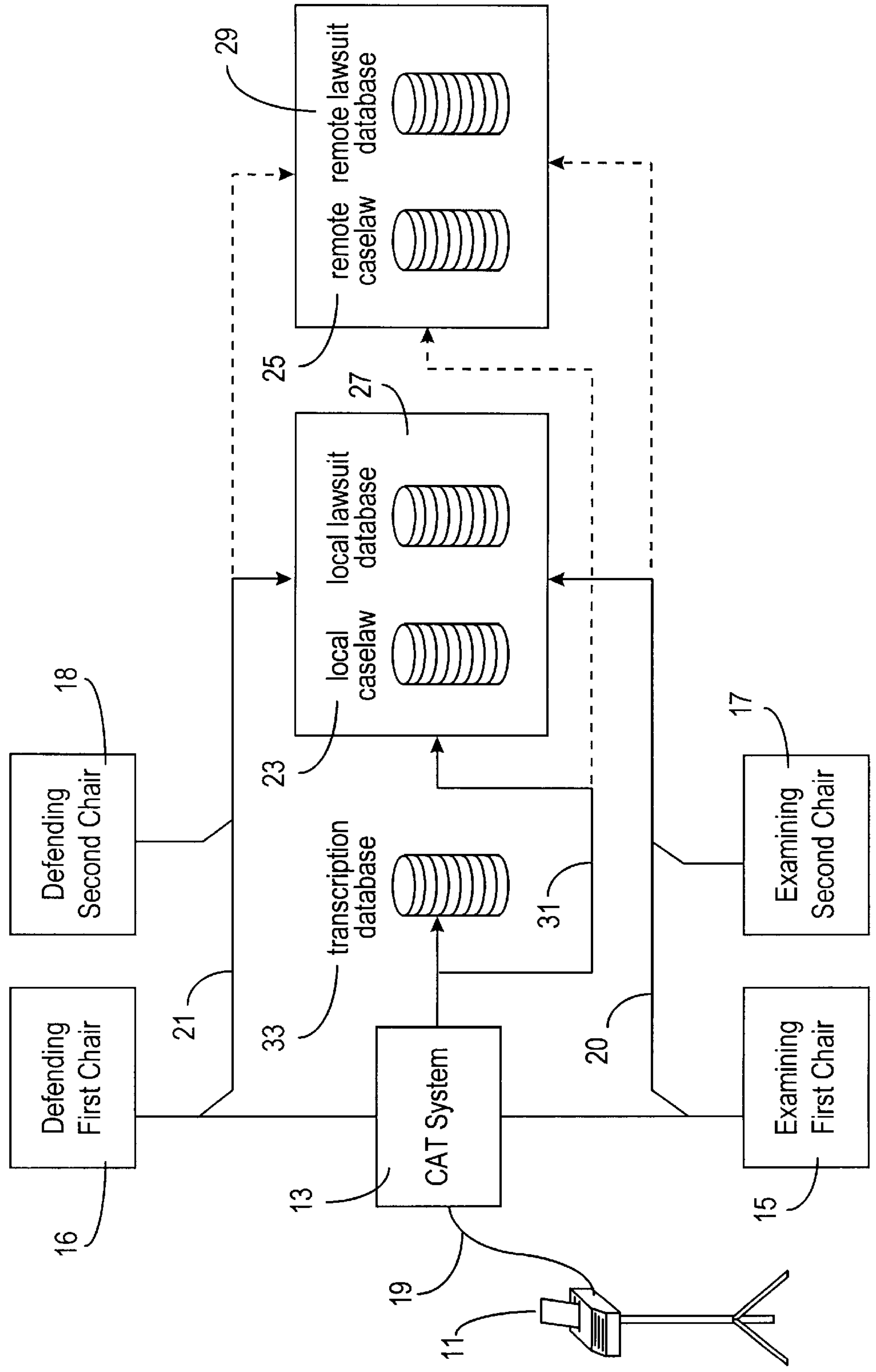
FIG. 1 is a block diagram which illustrates an overall system configuration of the present invention as used in a legal proceeding such as a deposition or trial.

FIG. 1 is a block diagram which illustrates an overall system configuration of the present invention as used in a legal proceeding such as a deposition or trial. A stenographic recorder 11 is used by a court reporter at a deposition, hearing or other legal proceeding to record digital coded signals representative of the words spoken as they occur in real-time. Using a communication link 19, the recorder 11 transfers the representative signals to a computer aided transcription ("CAT") system 13, a computer terminal used by the court reporter, for transcription into alphabetic and numeric text corresponding to the actual words spoken. As a basis for transcription, the CAT system 13 uses a cross-reference library which is stored in a transcription database 33.

The CAT system 13 communicates the transcribed alphabetic and numeric text it generates along two independent communication links 20 and 21. First and second chair examining attorneys view the transcription on examining attorney terminals 15 and 17, respectively. Similarly, first and second chair defending attorneys view the transcription on defending attorney terminals 16 and 18, respectively. Upon receipt of the communicated transcription, the attorney terminals 15, 16, 17 and 18 not only display the alphabetic an numeric text, but also provide a variety of tools for reviewing and evaluating what has been received. Concurrent with receipt and display of the transcribed text, the examining terminals 15 and 17 provide a vehicle for the first and second chair attorneys to exchange messages. Similarly, message exchanges between the defending terminals 16 and 18 are provided for terminals 16 and 18.

The attorneys at the terminals 15–18 interact with the transcribed text received in a variety of ways such as to create associations with notes created or messages received during the proceeding. A more complete description of the interaction is set forth in the pending parent U.S. application Ser. No. 08/036,488, filed Mar. 24, 1993, by Bennett et al. (Attorney Docket No. P93-00), which is incorporated herein by reference in its entirety.

The attorneys also interact through the terminals 15–18 with local or remote case law 23 or 25, respectively. The local case law 23 includes a CD-ROM based database which may be accessed directly via links 20 or 21, or indirectly through requests to the CAT system 13 which manages the searching via a communication link 31. The latter scenario is preferable for billing purposes. Similarly, access to law suit databases storing case evidence and possibly attorney work product is provided locally and/or remotely via law suit databases 27 and 29, respectively. Although not shown, it is also contemplated that the enumerated database could be further distributed or duplicated in the configuration illustrated.

From all sources of text received and displayed by the terminals 15–18, the attorneys can freely select portions thereof for searching the various case law and evidence databases with little or no typing or other interaction required. Various search modification aids and contextual analysis provide additional search preparation short-cuts which provide the attorneys with rapid access to needed information.

Although preferred, neither a keyboard nor a screen are necessary for the CAT system 13. In fact, the terminal itself, i.e., the functionality thereof, might exist within other nodes on the transcription network. For example, the functionality of CAT system 13 might be fully distributed within the recorder 11 and/or the examining attorney terminal 15. The functionality might also be fully or partially located at some remote, off-site location. Similarly, the present invention contemplates many situations where terminals are not available for each attorney present, such as where only the examining side uses terminals or visa versa, or where either side utilizes a single terminal. Situations may arise where no attorneys possess a terminal. Although not shown in FIG. 1, additional terminals might be used locally by the witness or off-site by magistrates, judges, clients, expert witnesses, or additional attorneys involved in the case.

Figure 2:
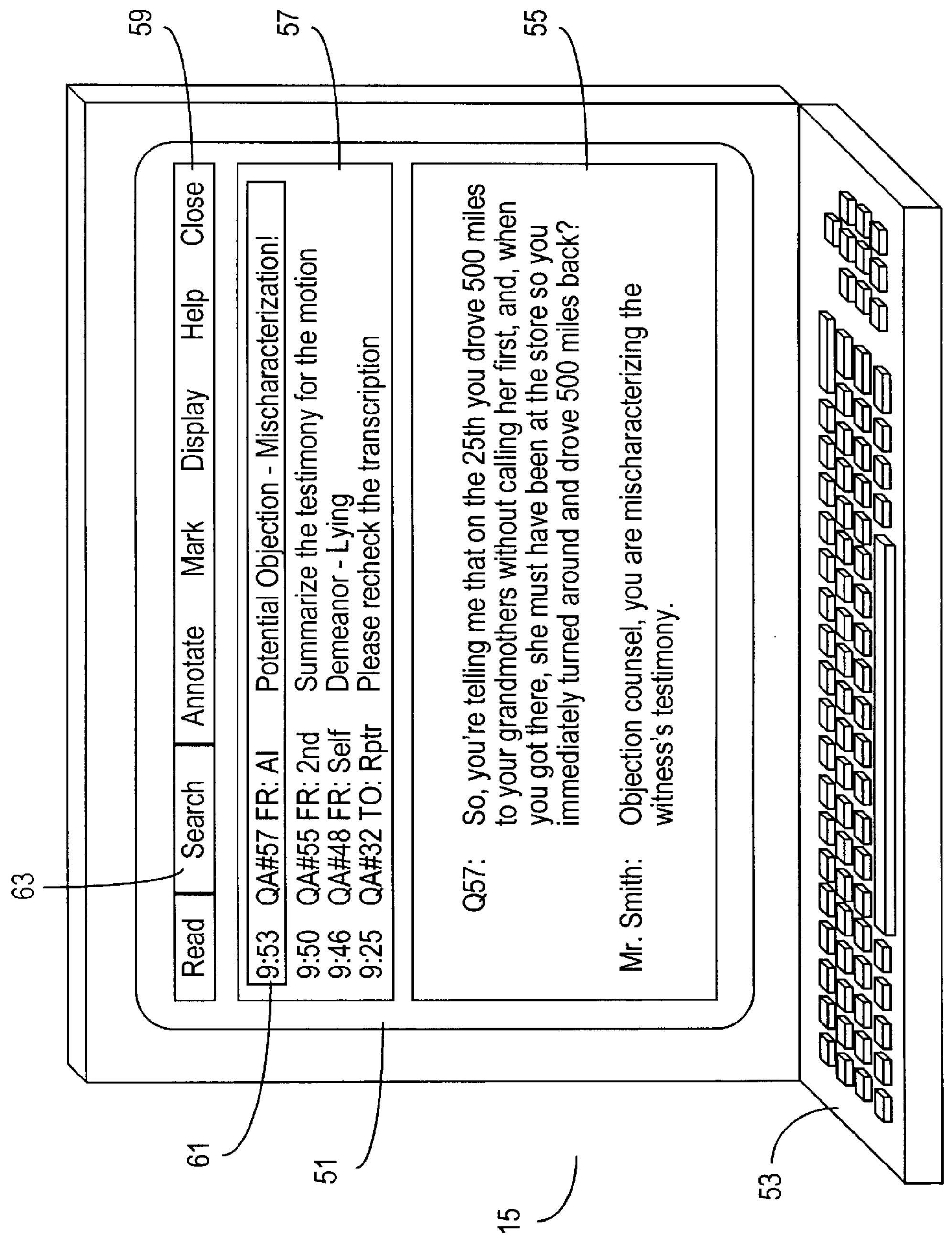
FIG. 2 is a detailed perspective view of the display of a down-line terminal according to the present invention which illustrates the use of context sensitive searching based on a mischaracterization objection.

FIG. 2 is a detailed perspective view of the display of the attorney terminal 15 according to the present invention which illustrates the use of context sensitive searching based on an exemplary mischaracterization objection. As shown, each attorney terminal such as the examining attorney terminal 15 includes a screen 51 and a keyboard 53. The screen 51 is split into a transcription window 55 and a communication window 57, having a common command line 59. The transcription window 55 displays the transcribed text received from the CAT system 13, by sequentially displaying questions (Q's) and answers (A's—not shown) and miscellaneous associated conversation (from the defending attorney Mr. Smith) in virtually real-time.

The communication window 57 provides a visual display in either a stack mode and an edit mode. In the stack mode, the communication window 57 displays the first line of every communication received. The attorney terminal 15 receives communications from three sources: 1) the keyboard 53—personal notes "From: Self" or messages "To:" others; 2) the examining attorney terminal 15 through artificial intelligence ("AI") algorithms—"From: AI" conveying potential objections or deposition scheduling messages; and 3) other terminals on the network such as from the second chair examining attorney via the attorney terminal 17—for example "From: 2nd". Upon selection of a desired communication from the stack of messages illustrated in the window 57, the window 57 enters the edit mode, displaying the full text of the selected communication. While in the edit mode, communications may also be created, modified, deleted, copied, printed, or communicated to the other terminals such as the terminal 17.

Throughout the deposition or trial, the terminal 15 displays various contextual text, i.e., the transcript text and associated communications from all sources. In most circumstances, the displayed contextual text not only creates the need to search case evidence or law, but also provides a significant formulation of terms needed to conduct that search. Instead of requiring a complete reformulation and retyping of a search, the searching front-ends of the present invention provide for immediate searching based on the available contextual text being displayed. Additionally, when necessary, the searching front-ends provide for rapid modification of the contextual text with minimal attorney interaction.

For example, objections to the form of question must be seasonable, therefore timing is of utmost importance. To aid the objection process, artificial intelligence software routines analyze the form of each question and the content of each answer to provide various potential objections that the examining or defending attorney may want to take into consideration in attempting to achieve proper evidentiary form. For example, a search is made on each question for phrases such as "you said", "you stated", "you say", etc. If found, the AI routines immediately send a potential objection to the communication window 57 indicating that the question possibly mischaracterizes the witnesses' earlier testimony.

Specifically, as illustrated, in the fifty seventh question (Q57), the examining attorney attempts to achieve proper form by summarizing the witnesses previous answers which may have spanned several hours-of the deposition or trial. Each attorney knows that with a summarizing question, a short, affirmative answer thereto can be easily extracted from the witness. The attorney can then more effectively utilize the resulting question and answer in a brief, motion or other legal argument involving the factual issues being summarized. However, in the attempt to summarize the prior testimony, the examining attorney is likely to mischaracterize the what was stated either intentionally to achieve some legal advantage or unintentionally due to poor recall of the previous questions and answers which are used for the summary.

The AI routines immediately detect the attempted summary such as is represented by Q57, and send a potential mischaracterization objection 61 to the attorney terminal 15. In an attempt to avoid such a compact and potentially incorrect formulation of the facts, the defending attorney, a "Mr. Smith" in the illustrated example, objects. The objection is registered by the attorney terminal 15 in the transcription window 55. The examining attorney may immediately respond by selecting the objection message 61 (illustrated by highlighting), and then selecting a search control 63 to initiate a search.

The terminal 15 responds to the selection of the search control 163 by first analyzing the context of the current display. By engaging in the analysis, the terminal 15 finds that the search is most probably based on the selected objection 61, not the terms therein. The terminal 15 also identifies the text of the associated Q57 as the basis for a search, and, most likely, the specific database and database units to be searched are the current transcript and Q & A's therein, respectively. The terminal 15 makes this determination based on the probability that, given the context, the attorney will want to find all of the previous Q & A's which were used in the attempted summary of Q57 involving the current transcript so that a non-objectionable reformulation of the summary can be made. As each previous Q & A's is located via a search, the examining attorney may sequentially read them into the record without mischaracterization, and thereby achieve proper form.

Figure 3A:
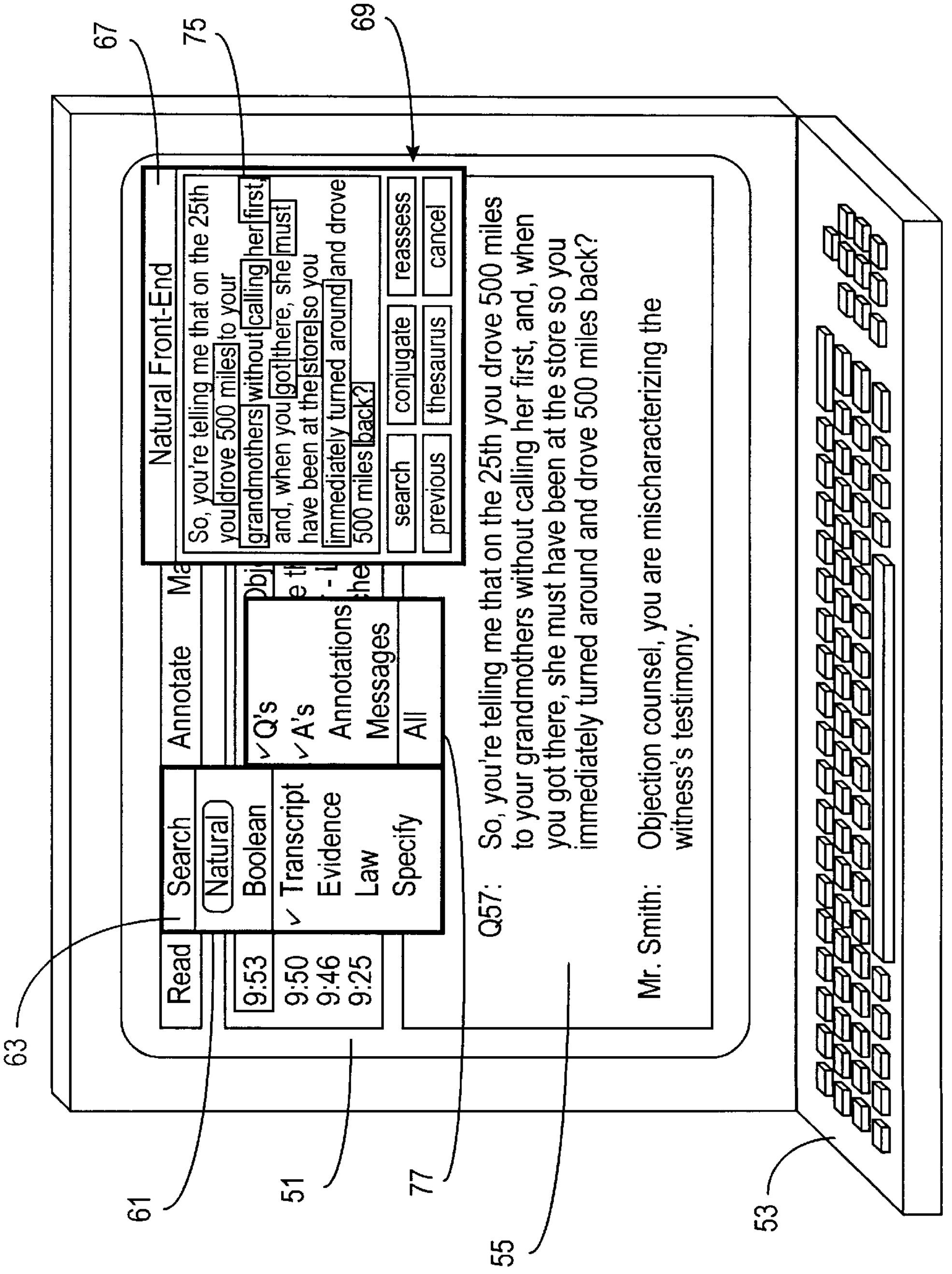
FIG. 3*a* is a detailed perspective view illustrating a further display of the down-line terminal in response to the mischaracterization search selection detailed in FIG. 2.

FIG. 3*a* provides an illustration of the specific response of the terminal 15 to the selection of the search command 63. When the examining attorney chooses the search command 63 in response to the mischaracterization objection, a pull-down search menu 65 appears offering two choices of searching front-ends and various selections of databases and database units for searching. Initially, the attorney may override the database and/or database units to be searched by "checking" those more appropriate. Similarly, additional databases and/or database units may be selected. However, as previously stated, because of the context, the terminal 15 has automatically selected the current transcript and Q & A's therein for searching. In addition, changes in the database or database units may be made at any time during a search, and the terminal 15 will continue the search through the new selections without requiring search modifications.

Either a natural language or boolean searching front-end may be selected from the pull-down menu 65. Once either is selected, the terminal 15 automatically attempts to formulate a search based on the context which may be initiated with little or no modification or interaction required. In particular, the natural language front-end of the present invention provides fully functional searching capability which, in most circumstances, requires no typing by the attorney. In the illustrated example, because the attorney selected the potential mischaracterization objection 61 before selecting the natural language search, the attorney terminal 15 automatically formulates a natural language type search from the associated question, Q57.

First, the terminal 15 opens a natural front-end window 67 and displays Q57 therein. Thereafter, using statistical and grammatical analysis techniques, the attorney terminal 15 identifies and highlights those words of Q57 believed to have the most significance. Two colors of highlighting are provided: 1) no highlighting for insignificant words; 2) blue highlighting for words of normal significance; and 3) red highlighting for highly significant words. The highlighting colors or lack thereof provides the attorney with instant feedback as to what the terminal 15 plans to use for the search.

After verifying the significance classification of terminal 15, the attorney may immediately initiate the search by selecting a "search" button from a button control panel 69. If the attorney does not agree with the significance classification or would for any-other reason desire to modify the search, the search can be modified by a variety of tools available through the search window 67. In particular, the attorney may change the particular significance of a search word to the context of the current case which the terminal 15 did not, or could not, detect. In particular, highlighting priority may be toggled from no highlighting, to blue, to red and back to a non-highlighted condition by repeated selecting a given word. The attorney may also "double-click" (quickly select a search word twice) on a search word and significance number, and the number of times the word exists in the search database is displayed.

Additionally, if necessary the attorney may directly add additional terms or phrases via the keyboard 53 or by copying additionally displayed text into the window 67. The terminal 15 considers all new words added as significant (blue highlighting) unless a reassess button is selected from the button control panel 69. If selected, the terminal 15 applies the same statistical and grammatical analysis techniques on the newly added words. Thereafter, the attorney may again interactively change the resulting significance classifications, add additional words and reassess as necessary until the appropriate search is achieved. Once the attorney is satisfied with the formulated search, the attorney initiates the search by selecting the search button of the button control panel 69.

The term "search" as used herein is defined as follows. In the preferred embodiment (as will become apparent in reference to the FIGS. 11 and 12 below), instead of requiring an actual word search through textual database, an index (a database indexing structure) is prepared for the database which associates each word in the database, with the locations of that word in the database. A search word can then be used as an index into that database to directly access the information needed by the searching front-ends. A standard textual database search may also be used to carry out a majority of the functionality of the present invention; however, it is not the preferred mode of operation thus, the term "search" as used herein may refer to the indexing of the words in the database indexing structure associated with the database. In addition, if a standard textual searching of the database is chosen, searching refers to the actual parsing through the database to locate the text.

Because of the mischaracterization context, the attorney terminal 15 responds by immediately searching backward through every Q & A in the current transcript. The natural language front-end responds by identifying the most significant Q & A's in the transcript, i.e., the Q & A's offering the best possible matches. The identified Q & A's are ordered for sequential display by the terminal 15 upon repeated depression of the search button of the control panel 69. The attorney can discontinue this process at any time by pressing a cancel button of the control panel 69. To back-track through the search, the attorney may select a previous button in the control panel 69, and the terminal 15 returns to the last displayed Q & A identified.

The button control panel 69 also provides conjugate and thesaurus-buttons to aid the natural language search. The functionality associated with the conjugate button may be applied on a verb by verb basis or on all verbs in the search window 67. Application of the conjugate button directs the natural language front-end to locate all conjugations of the verb selected as word alternates when attempting to locate that verb in databases. Similarly, the thesaurus button may be applied specifically or to every word of the search. Choosing the thesaurus button directs the terminal 15 to consider all thesaurus type alternates for the word selected when attempting to locate the selected word in the database. Additionally, both the conjugate and thesaurus functionality may be applied selectively. By "double-clicking" a mouse button or by selecting either button twice in succession, the terminal 15 locates and displays a list of available conjugates or thesaurus alternate words. The displayed alternate words may then be specifically selected individually or in groups so as to ignore undesired alternates. Enabling, disabling or tailoring of the conjugate or thesaurus functionality can occur at any time before or during a search.

Only those conjugate and thesaurus alternates which exist in the selected database are offered for use in the actual search. In particular, the terminal 15 locates all possible words alternates for the selected search word whether or not they can be found in the database to be searched. However, those alternates which cannot be found are indicated to the attorney by displaying them in an italic font. Although the resulting search will not be able to locate the alternate, the alternate may be used to access further word alternates via a second selection of the thesaurus or conjugate buttons for that alternate. Similarly, any alternate words located may receive the same significance adjustment or alternate word association as any of the originally selected search words receive. The terminal 15 also provides significance classifications for the alternate words automatically.

As previously indicated, any word that is involved in the search which cannot be found in the selected database are displayed in italic font in addition to any highlighting which might be required. This feature immediately indicates to the attorney that the word is probably misspelled (red italics) or that the word is spelled correctly but does not exist in the database (blue italics). In the latter case, an alternate word could be selected using the conjugate or thesaurus buttons from the control panel 69. In the former case (red highlighting), the terminal 15 provides a spell-check, dictionary functionality upon a conjugate or thesaurus button selection. This functionality provides the attorney with potential word substitutes in much the way standard spell-checking software performs the task for word processing. The major difference, however, is that italics and highlighting are added to aid the attorney in selecting not only the correct but also a word which may be found in the database.

Additionally, from any word in the search window, the attorney may select the right mouse button which causes the natural language front-end to immediately search using the selected search word or selected portion of the search words displayed in the search window 67. This may occur after the attorney double clicks the left button to view the number of hits (i.e., the number of database units in which the selection may be found) and realizes that the subset search may provide the specific database unit at the root of the search. The double-left clicking functionality may be used on a single word or multiple words from the search words displayed. If all of the search words are selected, the attorney will be provided with the total number of hits located.

Because the number of hits may be very high, the attorney may modify the search to remove the more common words. However, such removal may no be necessary if there is an exponential-like database unit probability distribution. In particular, with reference to FIG. 3*b*, the natural language front-end of the present invention offers a sequential display of those database units in which hits occur on a highest to lowest probability basis. For example, a database unit containing all of the search terms is much more likely to offer the desired search results than another database unit having only a single search word hit. Similarly, database units offer higher probability of searching success than the others. The actual implementation of the prioritization of database units is described in more detail below in relation to FIG. 13. The relative probabilities of the database units registering hits are plotted upon attorney command in priority order in a graph window 78 with relative probability on the y-axis and hit number on the x-axis. As detailed below, hits can be determined without having to conduct a search. From this graph, the attorney can determine which if any of the hits to view by selecting a cut-off point using the mouse or cursor (as illustrated by the dotted line). Therefore, if an exponential type pattern is displayed (as illustrated), the attorney gleans that even if a large number of hits have been recorded, a reasonable number of database units need only be reviewed to find desired units. However, if instead the attorney notices that the resulting curve is very flat, to locate a desired database unit will probably require review a substantial portion of all of the database units hit. Based on the graphical review, the attorney may choose to modify the search without actually having to read anything if there is only a low probability of success. In addition, after selecting a portion of the hits for review, the terminal 15 computes the area under the selection of the curve to provide an overall probability number which indicates the chances that, if a desired database unit exists in the total number of hits recorded, the selected units will contain the desired unit. This percentage number along with the total and selected hits is displayed in a box 76.

If the attorney decides not to review the graph, the natural language front-end of the present invention automatically chooses the ten (10) best hits and reports the chances that those ten (10) contain the desired database unit (if it does exist at all) in the hits recorded. After reviewing the chance percentage, the attorney may then visit the graphing function to better adjust the search.

Adjusting a search using the graph window 78 is done by merely altering the search terms in the search window and selecting the reassess control from the control panel 69 while the graph window is being displayed. Doing so causes the terminal 15 to re-compute and re-plot the graph. In addition, by merely selecting a given term and then selecting the reassess control, the terminal 15 responds by updating the graph by using a second color to indicate the selected words contribution to the graph. Specifically, a single vertical bar representing a single database unit which contains the selected word would be divided vertically and color coding divided portions would indicate the amount of contribution by the selected word. In this way, the attorney can visualize the effect of removing words or otherwise comprehend the role of a given word in a search.

Additionally, the terminal 15 can automatically and directly annotate any text located in whole or in part to the source of the text used as the basis for the search for later recall and analysis. For example, upon selecting an annotate command from the command line 59, the terminal 15 will annotate displayed Q & A identified to Q57. In this way, after the proceeding, the search results can be reviewed without having to reformulate a search.

Figure 4A:
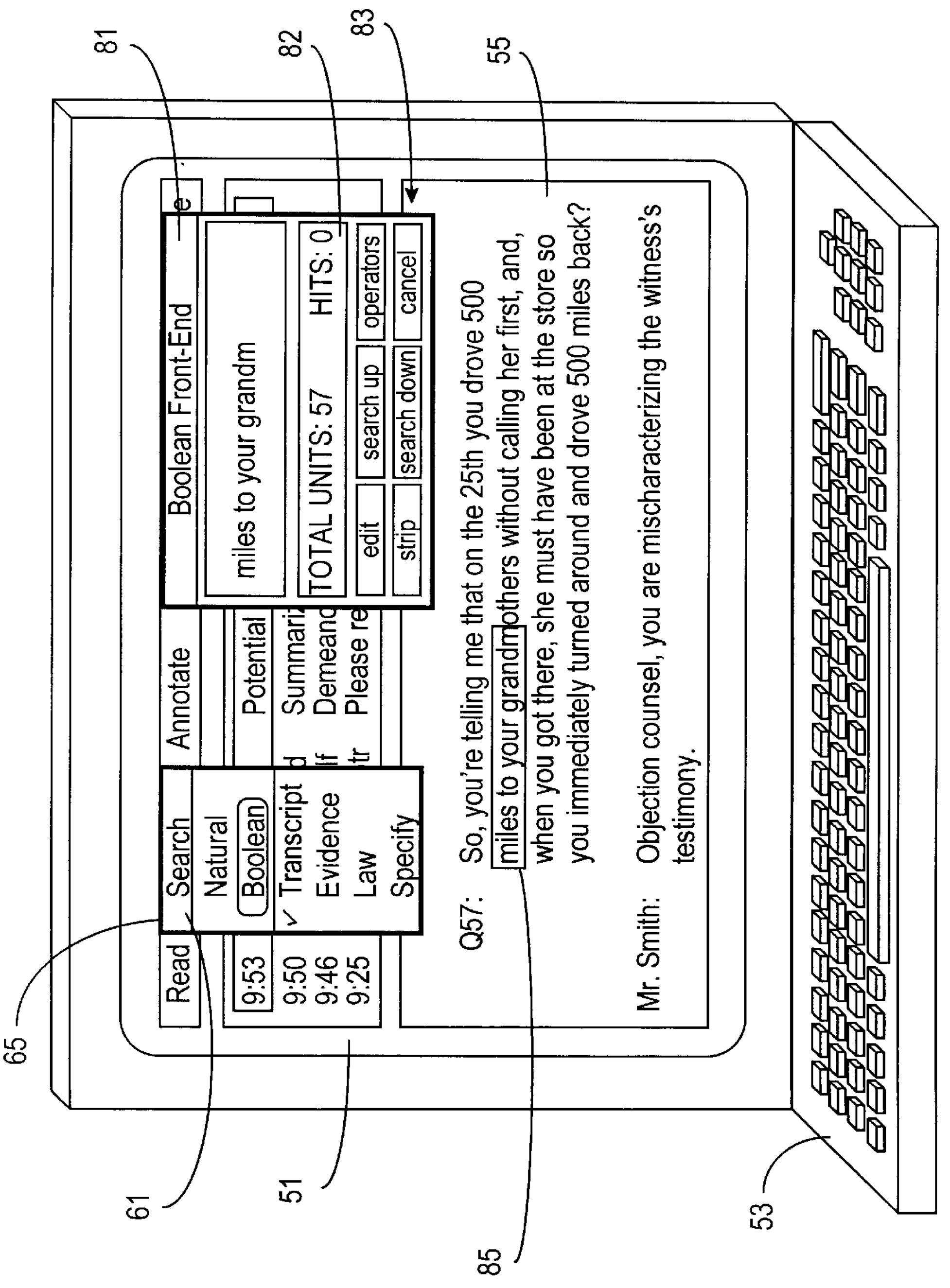
FIG. 4*a* is a detailed perspective view of the display of the down-line terminal which illustrates context sensitive searching using the boolean language searching front-end of the present invention.

Referring to FIG. 4*a*, in a variation of the previous example, instead of selecting the mischaracterization objection, the attorney may choose to directly search a portion of Q57 by highlighting the desired terms and/or portions thereof and pressing the search control 63. Again, as previously illustrated, the context suggests to the terminal 15 that the Q & A database units of the current transcript should be searched. Additional databases might also be simultaneously chosen or deselected by "checking" them at will. The database category labelled "specify" allows the attorney to define specific combinations of databases in part or in their entirety for rapid selection. The contextual conditions for selecting any of these libraries can also be configured using a setup routine prior to beginning the proceeding. Other automatic database selections are also contemplated which also provide for other contextual search requirements that might be at issue.

After selecting desired search text 85, instead of choosing the natural front-end, the boolean front-end is selected from the pull-down search menu 65. In response, the terminal 15 opens a boolean search window 81 from which a boolean type search may be formulated. Specifically, upon selecting the boolean front-end, the terminal 15 extracts the selected text 85, opens the search window 81, and places the selected text in work-space therein. The attorney may copy and paste additional sections of text from that displayed on the screen 51 if so desired. This can be accomplished using various editing functionality provided via an edit button of a button control panel 83.

A strip button in the control panel 83 borrows the statistical and grammatical computations of the natural front-end to strip out all unnecessary text captured using a quick selection of desired search text without having to worry about interleaving excess words. Particularly, the terminal 15 responds to the strip control by selectively highlighting only those words identified as significant. By selecting the strip button a second time, the remaining unhighlighted words (considered insignificant) are removed from the work-space 82. In the example illustrated, by "double-clicking" on the strip button, the window 81 only displays "miles grandm", by automatically stripping out the insignificant words "to and your". Moreover, as with the natural front-end, additional text may be selected, automatically added and stripped, or manually entered whenever necessary.

In general, the boolean searching front-end syntax is very similar to that provided in other legal searching databases familiar to most attorneys. The boolean syntax is constructed using logical operators ("&" or "OR"), wild card characters ("*" or "?"), parenthesis and brackets to modify the specific text to be located. All of these operators may be easily selected and inserted from a pull-down list upon selection of an operators button in the button control panel 83. Delimiter operators are also provided. For example, a "/2" delimiter expands the search to within two consecutive database units, while a "/3" corresponds to within three such consecutive database units, and so on. Various other types of well known delimiters are also contemplated.

Database units for the current transcript with only Q's selected via the pull-down search menu 65 is a single Q. Similarly, if Q's and A's are selected, the database unit for the delimiter would be a single Q & A. For case law, the standard database unit is a single legal decision. For most case evidence, the database unit would be a single document. Other databases similarly provide logical database units for searching.

Figure 4B:
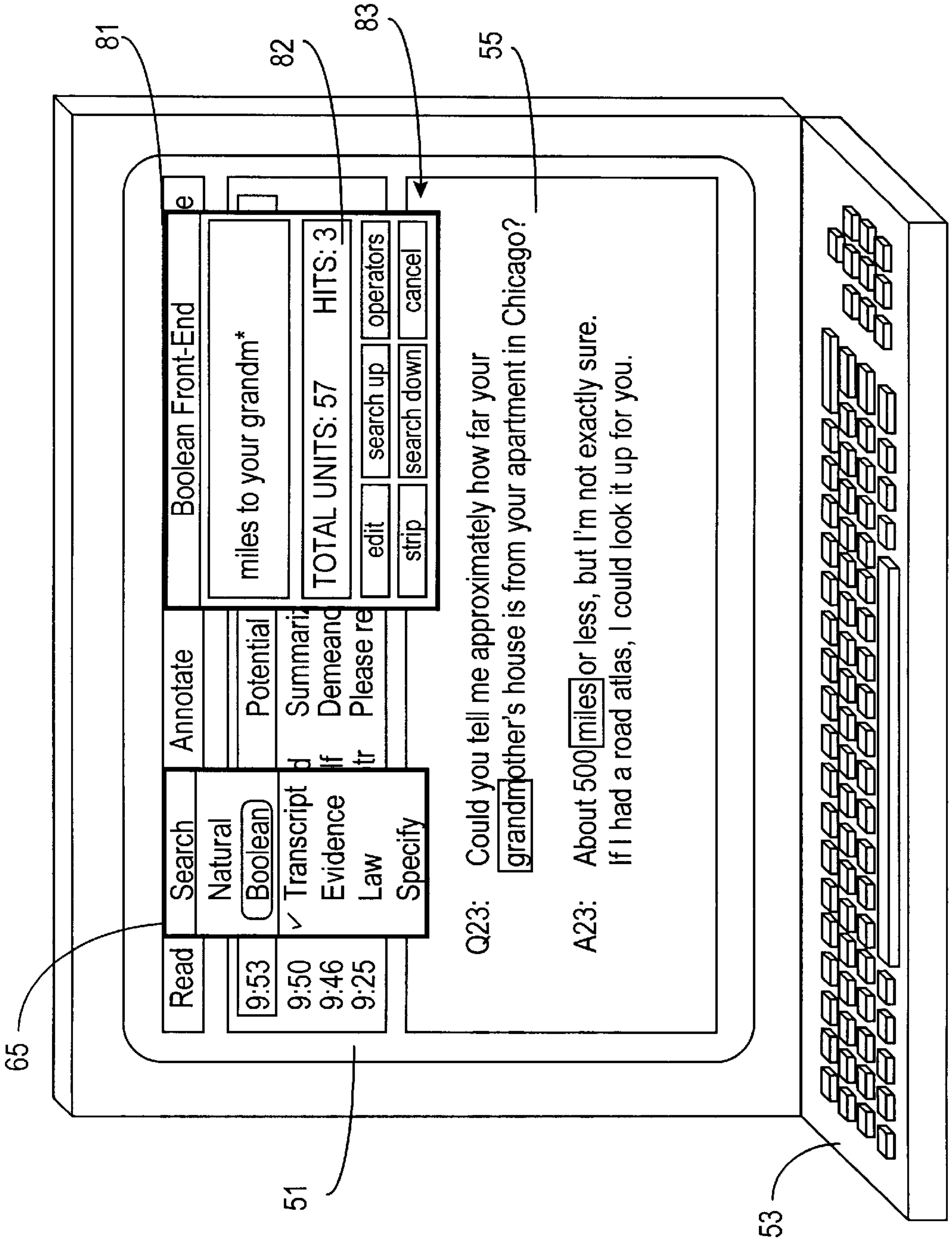
FIG. 4*b* is a detailed perspective view of the display of the down-line terminal illustrated in FIG. 4*a* providing specific detail as to the procedure and controls used to conduct the boolean front-end search.

FIG. 4*b*, illustrates a resulting boolean search formulation constructed by "double clicking" twice on the strip button and selecting the "&" operator using the pull-down selection of the operators button. The terminal 15 displays a resulting boolean "hit" at a Q&A#23 in the transcription window 55. This search was initiated and can be continued by selecting either search up or search down buttons from the control panel 83. As with any search, the identified Q&A#23 can be annotated (or associated) to the database unit from which the search text was extracted, in this example, Q57.

Figure 5:
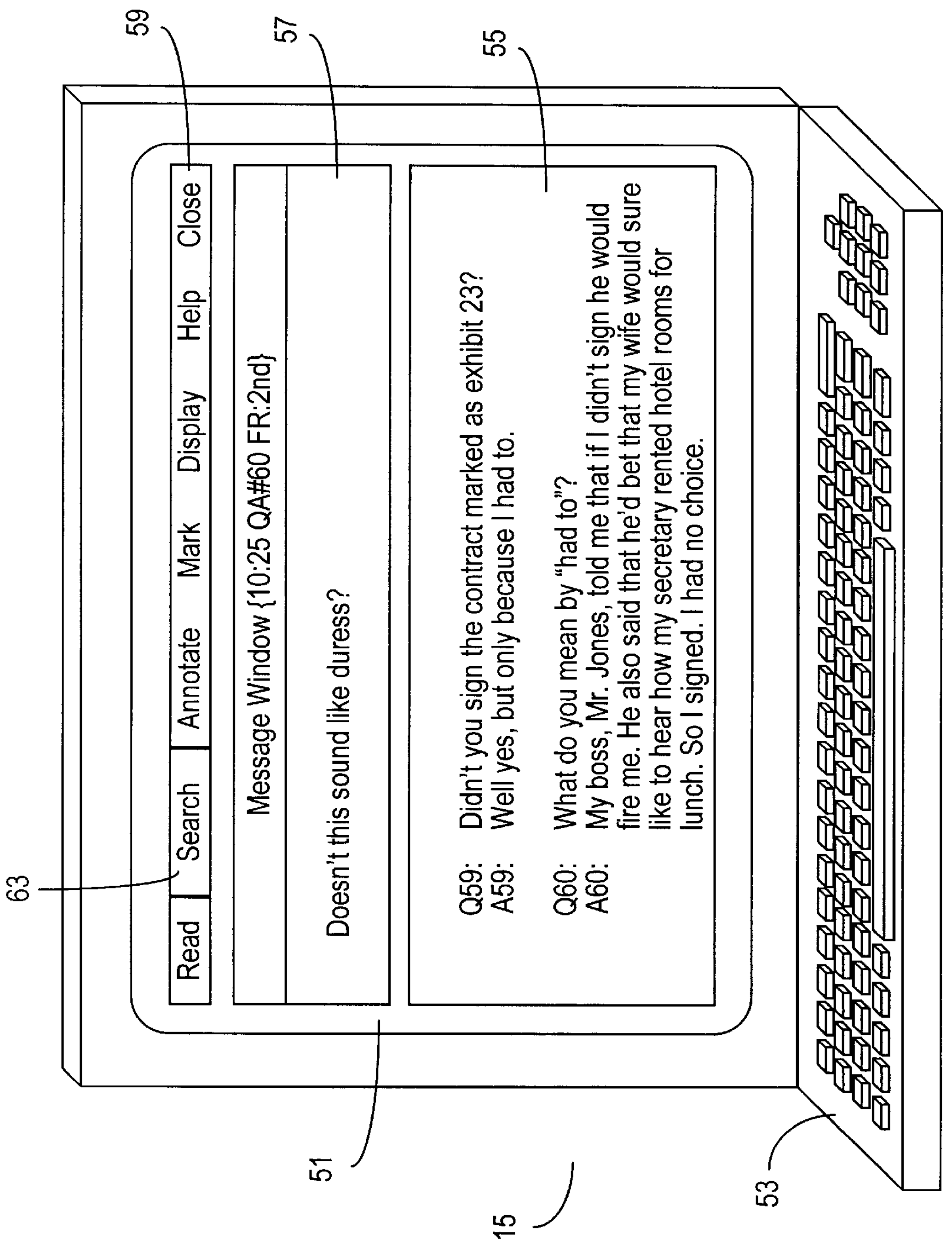
FIG. 5 is a detailed perspective view of the display of the down-line terminal according to the present invention which further illustrates a natural language context-sensitive search of case law, the search having been based on a communication from another terminal.

Referring to FIG. 5, the attorney terminal 15 also uses text from communications displayed in the communication window 57 for search formulations. Specifically, in the communication window 57, a message from the second chair attorney is received and fully displayed in the edit mode. The message displayed, which is associated with a Q&A#60, illustrates a typical response which the first chair might receive from an associate attorney after evaluating the Q & A's 59 and 60 displayed in the transcription window 55. Believing that the witness will only testify in common areas of contract law, an attorney finds that a new area of law, the law of duress, has unexpectedly become an issue in the case. If the attorney is unaware of the specifics of the law of duress, he may not be able to seasonably extract the appropriate factual information from the witnesses. Timing is critical here because if the witnesses counsel (the defending first chair attorney) has an opportunity to confer with the witness before the appropriate questions are asked, the examining attorney may be thwarted in obtaining critical evidence. Conferrals usually result in the "softening" of the testimony. Using the terminal 15, the attorney need only select the appropriate communication or portion thereof from the communication window 57. This can be done from either the stack mode or the illustrated edit mode. After selection, the search control 63 is selected, and, as previously described, either a natural or boolean type search can be conducted.

Figure 6:
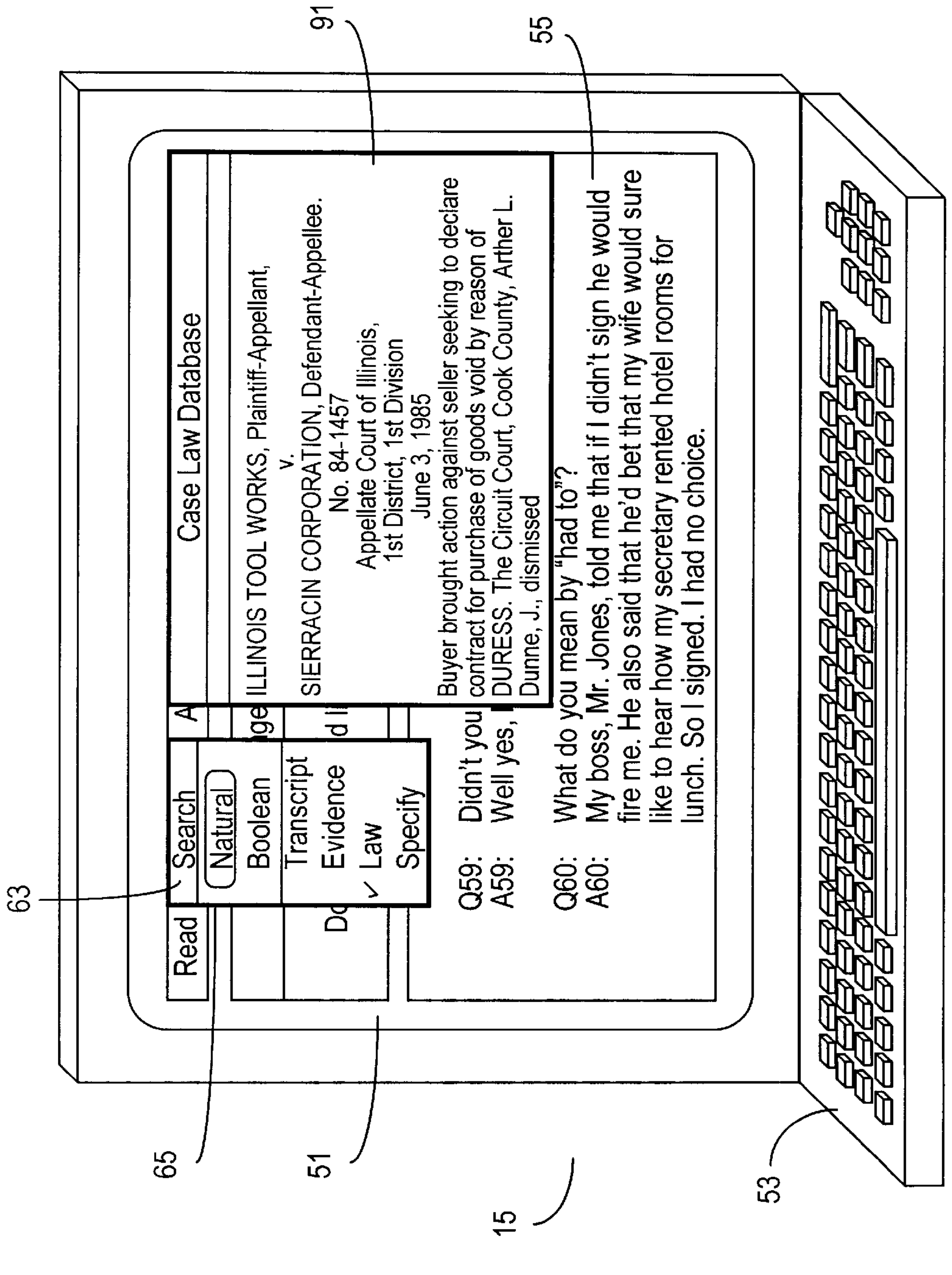
FIG. 6 is a perspective view of the display of the down-line terminal and searching context illustrated in FIG. 5 wherein a case law database is directly accessed.

Referring to FIG. 6, the selection of the search control 63 causes the display of the pull-down search menu 65. The terminal 15 analyzes the request by first looking to specific contextual clues such as previously detailed in regards to the misappropriation objection. Because no initial context can be detected, the terminal 15 next evaluates the words selected to see if any of them are legal terms, and identifies the legal term "duress". In identifying the term, the terminal 15 concludes that because of the legal term duress, the attorney is most probably desiring to search state case law. By then referencing the setup files, the attorney terminal 15 extracts the choice of law state and selects the corresponding libraries for searching. The terminal 15 thereafter automatically "checks" the "law" database from the menu 65, and although not shown, "checks" the appropriate state law library in a second pull-down window, that is similar to the second pull-down menu 77 of FIG. 3*a*, which lists the various libraries of the law database which are available for selection. The auto-selection of either the new database or library selection can be modified by direct selection by "clicking" the pull-down menus.

Figure 3B:
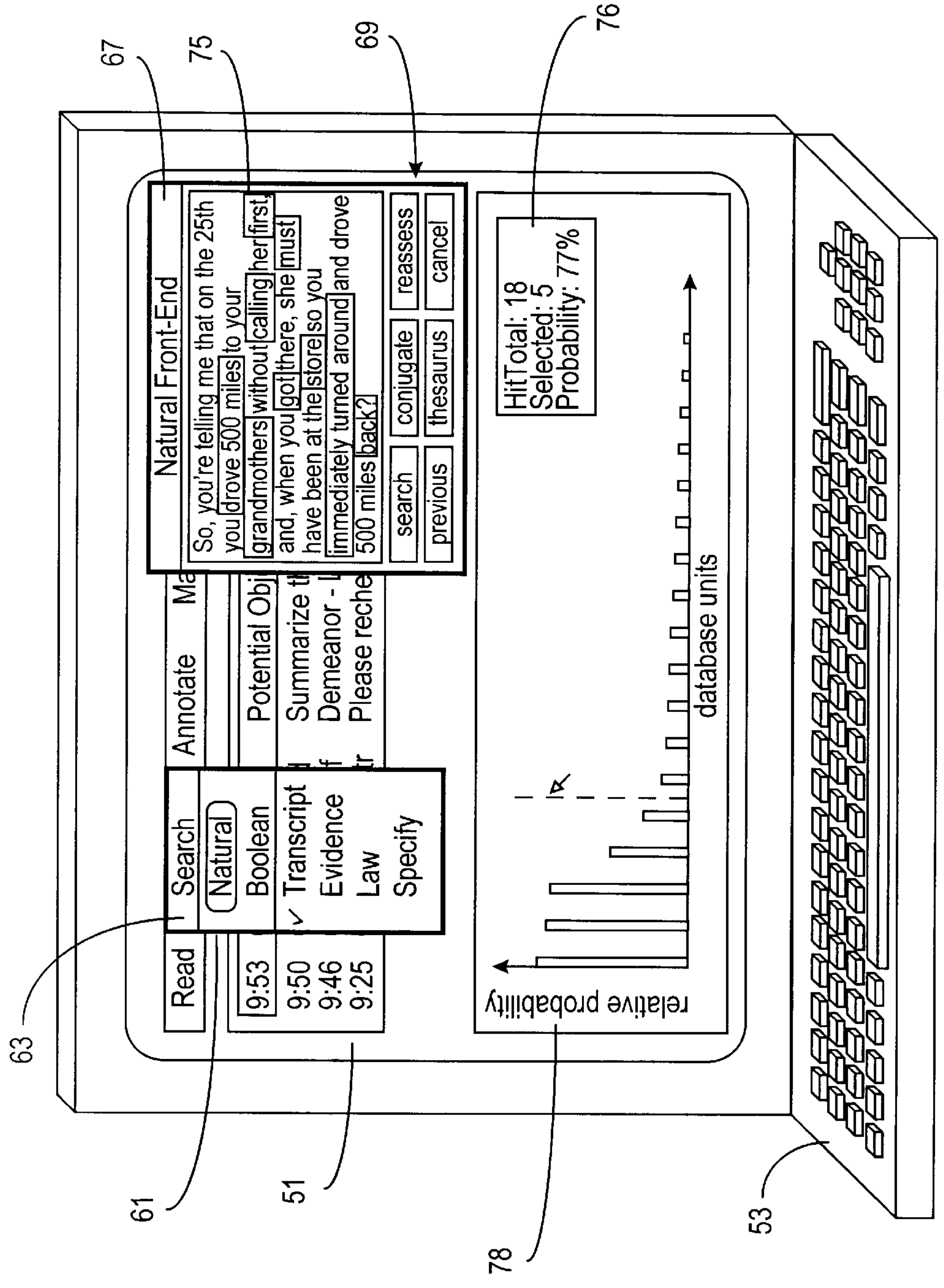
FIG. 3*b* provides an illustration of the operation of the interactive natural language search of the present invention which includes graphical database searching information aiding in the formulation of a search.

Although not specifically shown in FIG. 6, by selecting the natural language front-end, a natural searching window such as that displayed in FIGS. 3*a* and 3*b* is provided for potential modification as described above. Similarly, a boolean front-end might also be selected and interactively invoked, as described above. In addition, if during a search using one front-end, the attorney realizing that the other might be more appropriate can merely select the other front-end from the search pull-down menu 65, and the terminal 15 moves the selected search words to the newly selected search window.

In response to the search initiation, a case law database window 85 is opened to display case law retrieved. All preliminary library selection, log-in interaction, etc., happens automatically without attorney intervention. Additionally, the default number of cases desired and time-periods for case law search inquiries may be preset contextual information provided during setup.

As illustrated in FIG. 1, locally stored case law may be provided on compact disk and managed by the CAT system 13 as described above. Remotely located case law databases accessed may be those provided by West Services, Inc. (Westlaw®) or by Mead Data Central (Lexis®) wherein the interfacing and case law retrieval occurs in the background oblivious to the attorney. In addition, to take full advantage of a natural language searching front-end that might be associated with remote case law databases, instead of sending only the highlighted text identified, the attorney terminal 15 might also forward the full selected text selection to aid the remote natural language search, for example, by enabling grammatical context analysis.

Figure 7:
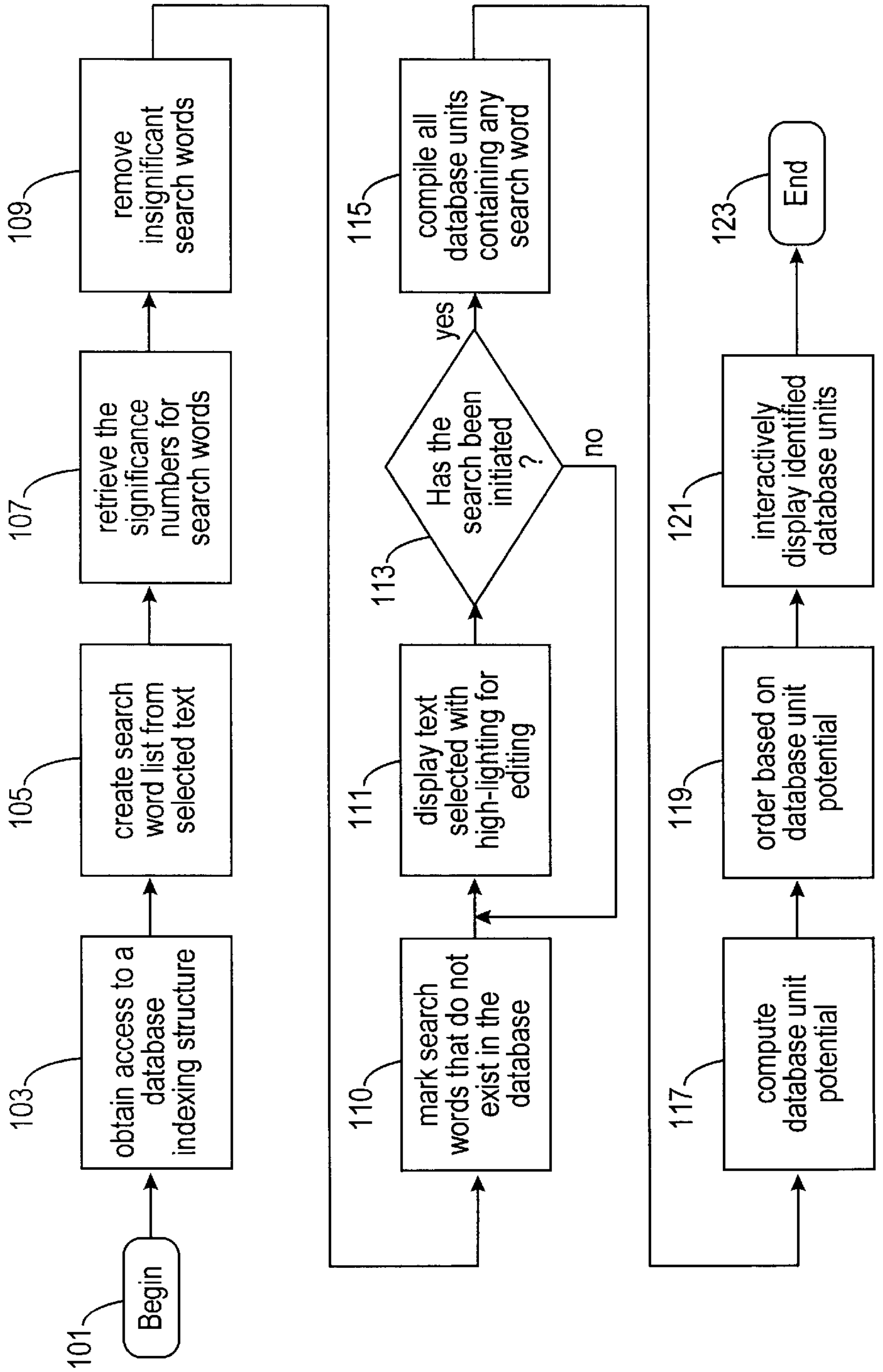
FIG. 7 is a flow diagram illustrating operation of the computer software utilized by the down-line terminal of the present invention in providing for an interactive natural language search.

Referring to FIG. 7, a flow-chart provides a detailed illustration of the operation of the software routines used by an attorney terminal, such as the terminal 15, for managing a natural language front-end search. Whenever natural language search is selected, the terminal 15 initiates the illustrated software routine at a block 101 labelled "begin". At a block 103, the terminal 15 obtains access to a database indexing structure described in more detail below which contains a nearly complete set of all of the possible words which might occur in the proceeding, and which also contains pointers from every word used in the proceeding to every Q or A that contains that word. Access to the database indexing structure may be achieved in a time sharing fashion with the CAT system 13 and other terminals on the network. In one such configuration the CAT system 13 acts as a file server and database indexing manager via the transcription database 33. Maintenance involves adding the location of each word transcribed to the structure. Alternatively, each attorney terminal may maintain (via transcribed word additions) the entire database indexing structure locally if access is shared, at the end of the proceeding, the attorney can copy the structure locally to take with them for review without having to consider maintenance. If maintained locally, access is virtually immediate.

At a block 105, the terminal 15 generates a list of search words comprising each unique word and/or partial word in the text which has been selected for the natural language search. As previously described and as described in more detail below, the terminal 15 thereafter uses each of the search words to extract a significance number associated there with, at block 107. At a block 109, the attorney terminal 15 compares the significance number of each search word with two significance threshold values. If the comparison indicates that a search word is below both thresholds, it is declared insignificant. The remaining words are at least considered significant and, therefore, will at least receive blue highlighting. If, however, any of the remaining search words have significance numbers above the highest of the two thresholds, the word receives red highlighting indicating enhanced significance.

Additionally, the terminal 15 utilizes the database indexing structure to determine whether the search words have even been used in the database to be searched, at a block 110. Each word that does not exist is additionally identified with italics. This procedure might also occur before the significance classification and may be used only on significant words if desired.

Upon classifying the significance and determining the existence the search words in the database, the terminal 15 displays the search words in a format indicating word significance and existence so that the attorney may immediately comprehend the nature of the search and possibly modify the search and/or initiate the search, at a block 111. Specifically, the words believed to have the highest significance receive red highlighting, those believed to have the lower threshold significance receive blue highlighting, and those believed to be insignificant receive no highlighting. Italics are displayed for any search word which does not exist in the database to be searched.

An attorney noticing a red highlighted term with italics immediately realizes that the given search word was not found in the database indexing structure at all. This in turn indicates a possible misspelling. If the attorney attempts to choose alternate word associations using the thesaurus or conjugate buttons as previously described, a spell-checker provides a correct spelling via suggested spelling alternate words. These suggested alternate words also utilize the italics to indicate whether the suggested word was used or not in the database. Specifically, only words which exist in the database indexing structure are offered as spelling substitution. However, even words in the structure which have not been used in the actual database itself are still offered with italics indicating the situation. The attorney might choose such substitution merely to get to the thesaurus or conjugate functionality. Moreover, blue italics indicates that the word exists in the database indexing structure yet has not been used in the corresponding database. Conjugate and thesaurus functionality can be accessed to find word alternates which do exist in the database.

Editing capabilities are also provided from which the selected search words might be removed from or added to the unique word list or to tweak the significance categorization if desired before initiating the search via a block 113. The variety of editing functionality including the graphical interfacing is also provided at the block 111.

More specifically the thesaurus and conjugate buttons of the control panel illustrated in FIGS. 3*a* and 3*b* above, provide alternate words to expand a search where necessary. Only, the word alternate with the highest significance number is considered in determining the "hit" probability of a given database unit. Although a more complex averaging scheme might be used, the additional overhead does not seem justified. This is only an issue when multiple alternate words occur in a single database unit.

At a block 115, after initiating the search, the terminal 15 compiles all database units that contain significant search words. As previously detailed, the transcript database units are Q & A's if Q's and A's were selected for the database units to be searched. Other database units depend on the database selected for the search. Again, in the preferred embodiment, "searching" actually involves direct retrieval of the locations of words via the database indexing structure and not actual text string searching. In the block 115, all of the locations are complied using the direct retrieval.

At a block 117, the terminal 15 computes the potential likelihood that a given database unit identified at the block 115 provides the information desired by the attorney. Specifically, the terminal 15 sums up the significance numbers of the search words located in each-database unit recording "hits". This sum is herein referred to as relative probability. Again more complex schema are contemplated but are not believed to offer any significant overall advantage.

Thereafter, at a block 119, the terminal 15 orders the database units with the highest relative probabilities first and lowest last. Ties encountered in the summation of the significance numbers are decided by ordering the most recently occurring database unit of the ties first. Thereafter, at a block 121, the terminal 15 provides an interactive, sequential display of the identified database units in their order of potential likelihood of success. Included herein is the calculation of the probability percentage illustrated in FIG. 3*b*. The basis of this calculation involves a presumption that the formulated search contains one and only one database unit which will meet the attorney's goals if located. Certainly, this is often not a factual assumption; however, it provides a sufficient basis for providing immediate feedback to the attorney regarding the nature of the search word(s) in the database to be searched. To calculate the probability percentage, the terminal 15 sums up all of the relative probabilities of each of the identified database units. Next, either using the default "review number" (the top ten database units) or the selected review number via the graph, the terminal sums the total relative probability of these best-match units, and, by dividing the two and multiply by 100, the terminal 15 produces the probability percentage. The block 121 also provides the variety of interactive search adjustments previously detailed.

Finally, the software routine ends at a block 131 whenever the attorney discontinues a search via the cancel button in the button control panel 69.

Figure 8:
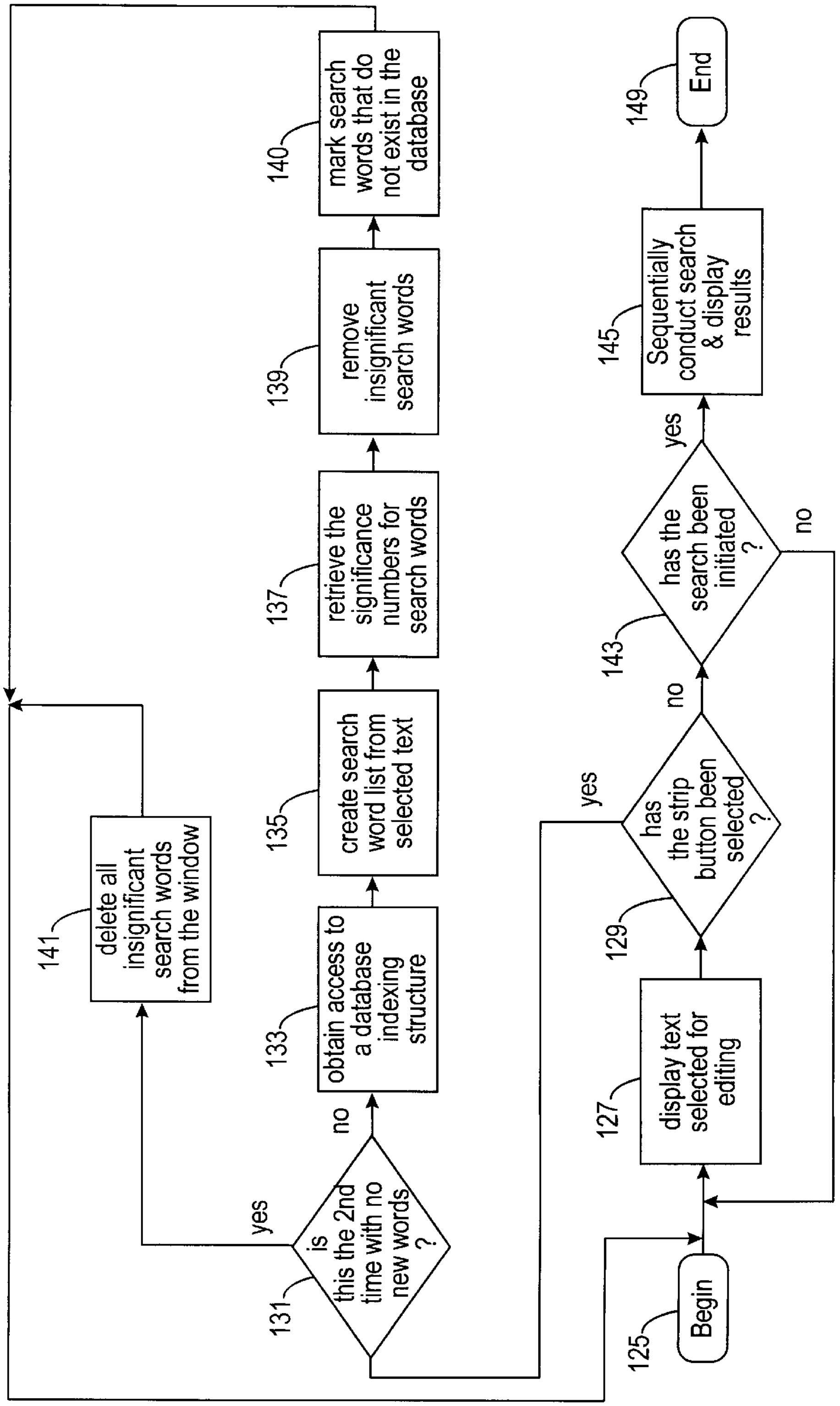
FIG. 8 is a flow diagram illustrating the operation of the computer software utilized by the down-line terminal in providing for an interactive boolean search.

Referring to FIG. 8, a software flow diagram is provided which illustrates the operation of the software routines used by the terminal 15 to carry out a search using the boolean front-end. The process begins at a block 125 upon selection of the boolean front-end from the pull-down search menu 65. The text which has previously been selected for the search from anywhere on the display of the screen 51 (if any) is copied and placed into the boolean search window 81 for editing at a block 127. As previously described, copying, pasting and other editing functions described above in relation to FIGS. 4*a* and 4*b* are provided at the block 136 via the edit button of the button control panel 83 to permit the attorney to better formulate search. Also via the edit button, the attorney has access to the thesaurus, conjugate and spell-checker routines to aid search word selection.

During the formulation stage if the attorney selects the strip button of the control panel 83, the terminal 15 branches to a routine for stripping out excess insignificant search words. Among other benefits which follow, this feature permits the attorney to rapidly select all desirable words being displayed which are surrounded by insignificant contextual words without having to carefully select or retype and possibly misspell the desired search words. The attorney merely selects a group of text containing the desired search words being displayed, presses the search control 63, selects "boolean" from the search menu 65, and presses the strip button twice. The terminal 15 responds by stripping all insignificant words from the selected group of text, leaving only significant words to be further manipulated for the boolean search.

Instead of rapidly selecting the strip button of the control panel 83, however, the attorney may perform the process in two stages. After the first selection of the strip button as identified via the block 129 and a block 131, the terminal 15 responds at blocks 133, 135, 137, 139 and 140, in the identical way described in relation to the blocks 103, 105, 107, 109 and 110 of FIG. 7, to classify the significance of the selected words and to identify those words that do not exist in the database to be searched. Thereafter, highlighting and italic emphasis are placed on the selected words in the search window 81. As previously described, the attorney may change the highlighting of the words to change their significance, to provide thesaurus or conjugate word alternates, etc., or to help identify words that will provide successful boolean "hits". In addition, the terminal 15 also provides the attorney with a count via the edit button of the number of times a given word (on boolean grouping of words) occurs in the database to be searched, enhancing the attorney's ability to analyze a search.

Via the decision blocks 129 and 131, if the attorney presses the strip button a second time, branching to a block 141 directs the attorney terminal 15 to delete all insignificant (unhighlighted) search words. Returning to the block 127, the terminal 15 thereafter updates the display by showing only the significant search words classified as significant.

By placing the cursor between two search words or search word groups displayed in the search window 81 then selecting the operators button from the button control panel 83, the attorney can easily choose and insert the available boolean operators with having to type. Specifically, selecting the operators button results in providing a pull-down series of all boolean operators which the attorney can freely choose. Selecting one of the operators causes the terminal 15 to immediately insert the operator at the cursor position in the search window 81.

The terminal 15 also analyzes the sequence of the search words and operators to determine if parenthesis might be needed. If so, the terminal 15 directs the attorney through a variety of matched parenthetical associations to identify the one most appropriate for the current search. For example, if the search involves the phrase "grandma & house or home", many attorneys would not be able to determine that the search could be interpreted two different ways. The search could be carried out by looking for all database units containing the words "grandma" and "house", and all database units having the word "home" alone. Alternately, the search might identify only those database units having the word "grandma" and either "house" or "home". To clarify the attorney's intent, parenthesis can be used; however, manually matching the numbers of parenthesis and proper placement thereof often prove to cause unnecessary delays. To avoid these difficulties, the attorney need only respond affirmatively to an automatic parenthesis placement prompt from the attorney terminal 15. In response, the attorney terminal 15 provides all possible variations of parenthesis placement, allowing the attorney to toggle there between to locate and select the proper form. Such prompting only occurs where multiple ways of interpreting the same search is possible.

As operators, additional words and parenthesis are added to the search, the attorney is automatically updated as to the number of database units that meet the currently displayed boolean search. In fact, the boolean search window 81 provides counters 82 which indicate the current number of database units and hits based on the currently displayed search or based on a selected sub-portion thereof. As the displayed search changes, the terminal 15 automatically updates the displayed number of hits. Based on the hit number, the attorney may choose to select additional search words and/or operators or simplify the current search to obtain a reviewable number of hits.

Additionally, the attorney may at any time choose to switch between searching front-ends or switch between or add different search databases via the search pull-down menu 65. By switching between front-ends, the terminal 15 merely moves the current search words into the alternate search window and searching may continue from the same point.

Once a search has been formulated, the attorney selects the search up or search down buttons from the button control panel 83 as needed to sequentially access and display the database unit hits. The terminal 15 carries this process out via blocks 143 and 145. Upon selecting the cancel button from the control panel 83, the terminal 15 ends the boolean search at a block 149.

Figure 9:
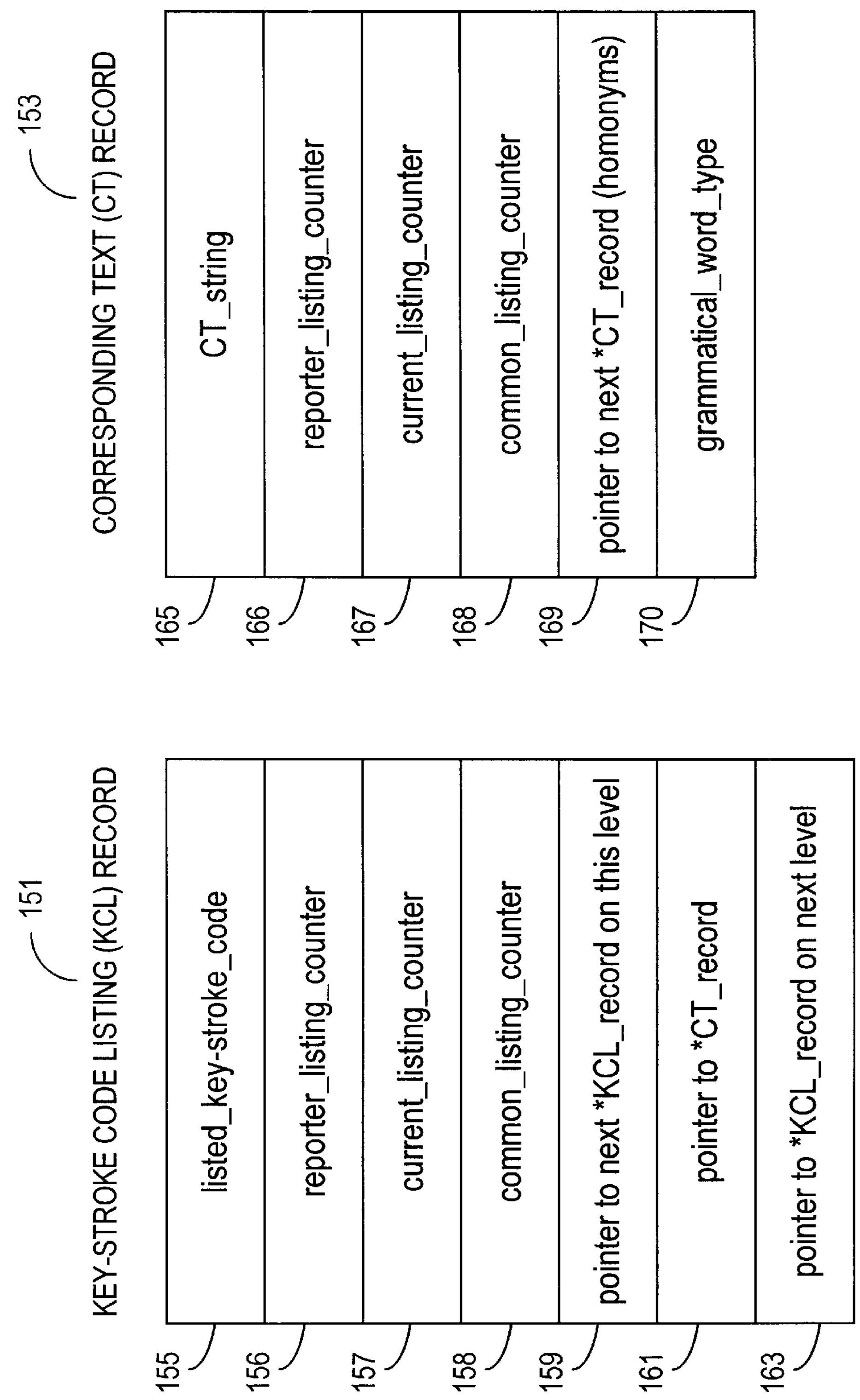
FIG. 9 is a diagram representing the association of data fields into three data records which are the basic building blocks for the overall transcription structure according to present invention.

FIG. 9 is a diagram representing the association of data fields into two data records which are the basic building blocks for the overall transcription data structure. In particular, the CAT system 13 utilizes a linked-list arrangement of two types of data records: a key-stroke code listing (KCL) record 151 and a corresponding text (CT) record 153. Although other types of records are contemplated, these two types of records provide the preferred storage structure for the court reporter's cross-referencing library.

Basically, the CAT system 13 uses records 151 and 153 to associate each individual key-stroke code with as many subsequent key-stroke codes as proves necessary to reconstruct spoken words. Particularly, the KCL record 151 associates: 1) a listed key-stroke code (LKC) field 155 for storing a specific key-stroke code; 2) a reporter listing counter field 156 for storing a value indicative of the number of times that the CAT system 13 uses the record; 3) a current listing counter field 157 for storing a value indicative of the number of times that the CAT system 13 uses the record in the current case; 4) a common listing counter 158 for storing a value indicative of the number of times that any CAT system, including the CAT system 13, used the record; 5) a first KCL_record pointer field 159 for storing a pointer to the next KCL record on this level; 6) a CT record pointer field 161 for storing a pointer to an associated CT record; and 7) a second KCL_record pointer field 163 for storing a pointer to a corresponding KCL_record at the next listing level down.

Similarly, the CT record 153 associates: 1) a CT string field 165 for storing a string of text; 2) a reporter listing counter field 166 for storing a value indicative of the number of times that the CAT system 13 uses the current string; 3) a current listing counter field 167 for storing a value indicative of the number of times that the CAT system 13 uses the string in the current case; 4) a common listing counter 168 for storing a value indicative of the number of times that any CAT system, including the CAT system 13, used the current string; 5) a CT record homonym pointer field 169 for storing a pointer to another CT record containing a homonym to the contents of the CT string field 165; and 6) a grammatical word type field 170 for storing an indicator of the grammatical type(s) of the word in the CT string field 165. Grammatical types not only include the standard noun, verb, adverb etc., but also include an additional category "legal" for legal terms.

Figure 10:
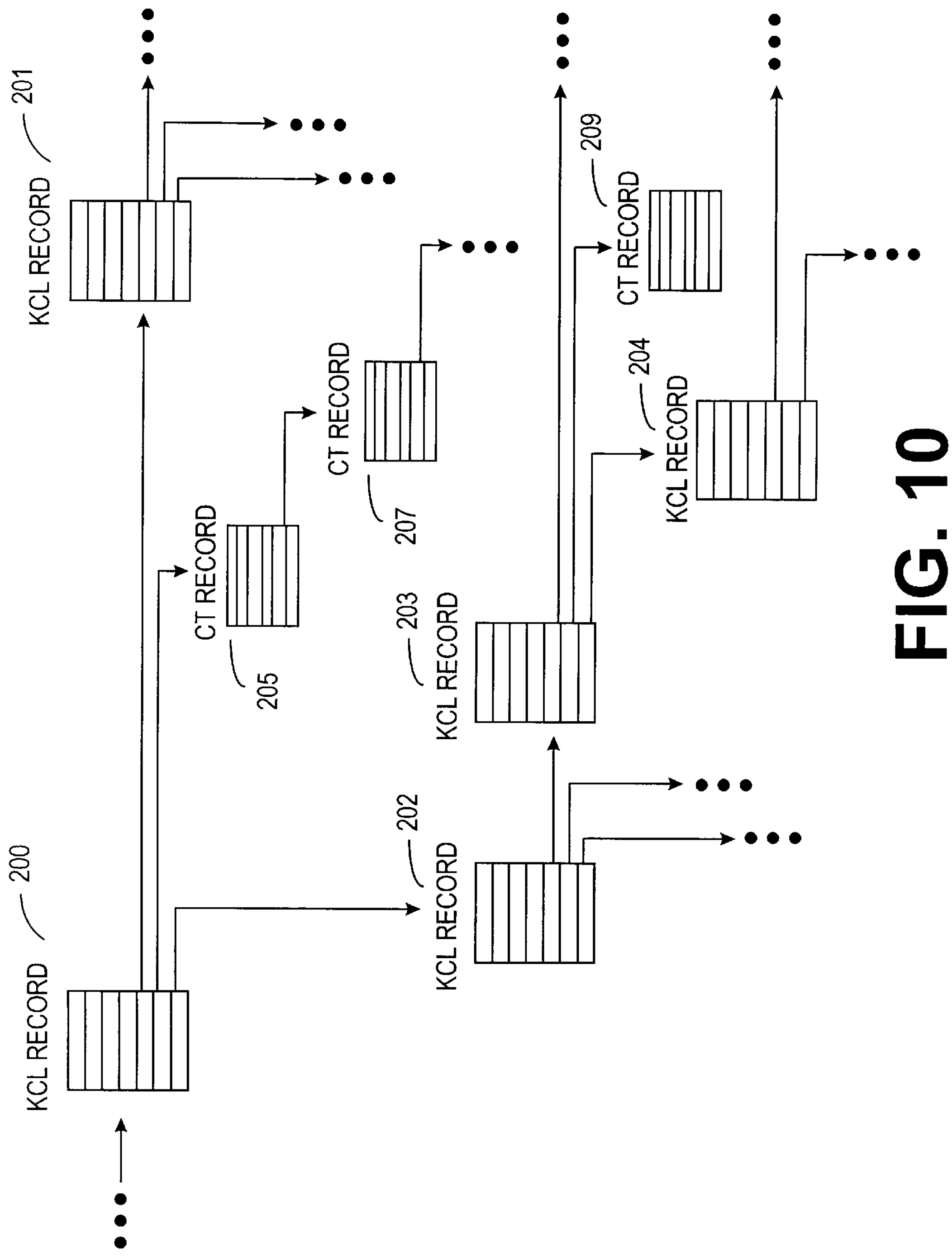
FIG. 10 is a detailed diagram representing the overall data structure of the cross-reference library used by the CAT system of the present invention to transcribe the key-stroke codes received from the stenographic recorder.

FIG. 10 is a detailed diagram representing the overall data structure of the cross-reference library used by the CAT system 13 to transcribe the key-stroke codes received from the stenographic recorder. KCL records 200, 201 and all KCL records (not shown) directly to the right and left of records 200, 201 constitute a first listing level. This first listing level is a linked-list of the each beginning key-stroke code of the words held in the cross-reference library 15. The KCL records are "linked" using the first KCL record pointer field 159, i.e., each pointer field contains the address in memory where the next KCL record resides.

All words which can be represented by a single key-stroke can be located using a single KCL record at this first level. Words requiring multiple key-strokes must identify the first key-stroke of the word in one of the KCL records at the first listing level, and that identified KCL record should then point via field 163 to a second listing level. For example the KCL records 200 points to a second listing level comprised of KCL records 202, 203, etc. Similarly, a third listing level exists below the KCL record 203 beginning with a KCL record 204, and so on as necessary to reach multiple key-stroke words. Additionally, the first or subsequent listing levels might be accessed using hashing code indexing for increased speed in access time.

To directly identify exact text replacement using the cross-reference library, the CAT system 13 would first need to know the number of key-strokes required to represent every given word. Because this does not occur, the CAT system 13 must use a searching strategy to identify these numbers.

Because most words can be represented by a single key-stroke, the CAT system 13 initially treats all words as a single key-stroke word. Only after detecting transcription problems with subsequent key-strokes will the CAT system 13 back-track and consider whether the key-stroke might be the first of a multiple key-stroked word. In particular, using the identified KCL records constituting a second listing level, the CAT system 13 must locate a single KCL record containing the second key-stroke in the multiple key-stroke series. The identified KCL record at this second level will point to a subsequent level for providing a subsequent key-stroke in the multiple key-stroke series. This process continues until the last key-stroke is identified.

In addition, each of the KCL records at any listing level may or may not point via the field 161 to associated text. If a single word corresponds to a single key-stroke, the identified KCL record in the first listing level will point to a CT record which contains the text of that word. Similarly, a KCL record in the first listing level will point to a CT record which contains the text of that word. Similarly, a KCL record at the second level identified for a word represented by two key-strokes will point to a CT record containing the actual text of that word. In this way, any key-stroke or series of key-strokes which represent a word can be transcribed if the cross-reference library contains the path to the word formed by the key-stroke(s) of that word, i.e., if the cross-reference library contains the text counterpart.

More particularly, upon receiving the first key-stroke code from a sentence, the code is compared with each key-stroke code stored in each KCL record on the first listing level. For example, if the received code does not match the stored code in the listed key-stroke code field 155 of the KCL record 200, the CAT system 13 uses the contents of the field 159 of KCL record 200 to access the next KCL record, the record 201, for a similar comparison to the code stored therein. In this manner, by stepping through the first listing level, a matching KCL record can be found.

Assuming that the code stored in KCL record 200 does match the first key-stroke code received, the CAT system 13 accesses the associated CT record 205 to retrieve readable cross-referenced text. Additionally in this example, the CT record 205 provides the CAT system 13 with a pointer to a homonym stored in a CT record 207. The text located in CT records 205 and 207 possibly provide the desired transcription, but only by transcribing the entire sentence can the CAT system 13 be sure. Often times, the CAT system 13 discards such text in favor of multiple key-stroke text. Particularly, the CAT system 13 uses the KCL record 200 as a back-tracking point. If in transcribing the sentence, the KCL record 200 only proves to be the first of two key-strokes, the CAT system 13 uses the KCL record 200 points to access a second listing level. This second listing level is specifically associated with the KCL record 200 and begins with KCL records 202 and 203 followed by all KCL type records (not shown) to the right of record 203. Any second code received which follows a first code which matches that stored in the KCL record 200 is compared to the codes stored in the KCL records on the second listing level. The KCL record 204 represents yet a third listing level under the key-stroke sequence stored in the record 200 and 203, and so on. CT records may or may not be associated with a given KCL record, depending on whether a corresponding word exists for the represented key-stroke code sequence. The KCL record 202 exemplifies such a situation.

Only a single CT record is generally associated with a single KCL record, such as is shown with KCL record 203 and a CT record 209. Only when homonyms exist will there be multiple CT record association, as illustrated with the KCL record 200 and the CT records 205 and 207. Multiple CT record associations, however, are indirect in that each KCL record can only identify, i.e., point to a single CT record. Additional CT record "homonyms" are pointed to by the identified CT record.

Upon receiving a first key-stroke code of a sentence from stenographic recorder 11, the CAT system 13 begins a transcription expedition by parsing through a first listing level of the cross-reference library in an attempt to find a matching KCL record. If a matching KCL record is found which has an associated CT record transcription, the CAT system 13 records the match and treats the second (next) code received as the beginning of a new word by parsing the first listing level.

If a matching KCL record is found for first code received which has no associated CT record, the CAT system 13 treats the second key-stroke code received as the second part of the word by branching to the second listing level pointed to by the matching KCL record (on the first listing level). Note that if properly constructed, there should never be any KCL record which has neither a pointer in field 161 to an associated CT record or a pointer in field 163 to a subsequent level of KCL records. If a match is found at the second listing level with an associated CT record transcription, the CAT system 13 treats the third key-stroke code received as the beginning of a new word by parsing the first listing level, repeating the cycle.

If after transcribing a series of key-strokes in a sentence, the CAT system 13 encounters a dead end, i.e., an associated CT record cannot be identified, back-tracking must occur. The CAT system 13 returns to the last matching KCL record of the previously transcribed word, and continues the transcription process through subsequent listing levels to see if what had been considered an entire word is really only a portion thereof. If a match is found with an associated CT record transcription, the CT record at that subsequent (deeper) listing level is stored, and the following key-stroke code received is treated as the beginning of a new word, repeating the cycle.

With each successive, unsuccessful parsing round, the previously described transcription process becomes more and more complex with potentially many parallel and nested transcription pathways being considered. If available, the first completely transcribed sentence found is communicated to attorney terminals 15 and 16. Otherwise, the sentence formulation with the greatest number of key-strokes transcribed will be prepared for communication.

Additionally, the CAT system 13 not only adds the transcribed words to the transcription database 33, but also maintains the corresponding database indexing structure by adding the location of each instance of the word thereto. This process is set forth in greater detail in regards to FIG. 12 below.

Figure 11:
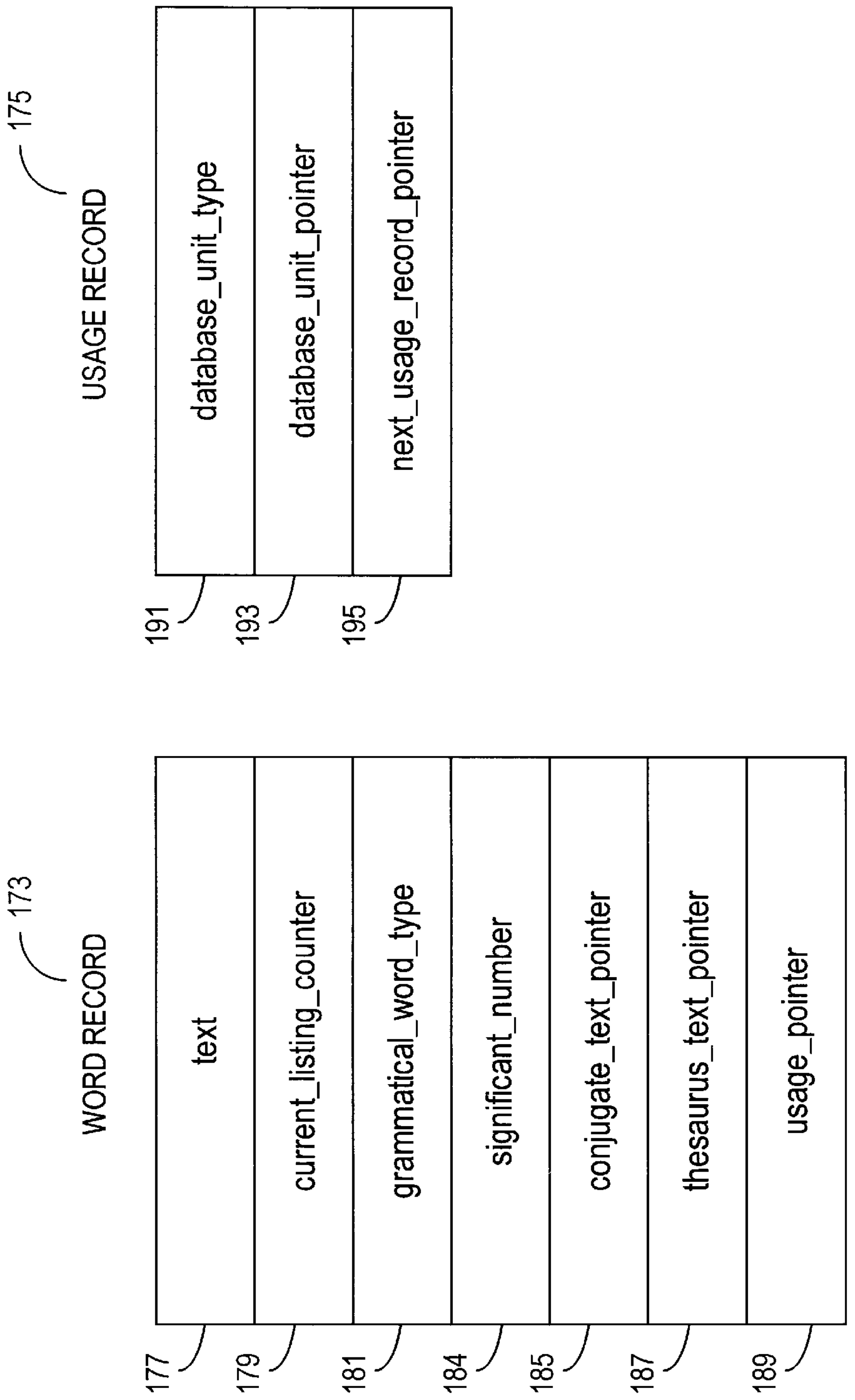
FIG. 11 is a diagram illustrating a set of data records involved in the database indexing structure according to the present invention which is used by the natural language and searching front-end to provide for search word selection, verb conjugation, thesaurus text and usage information for optimizing a search.
Figure 12:
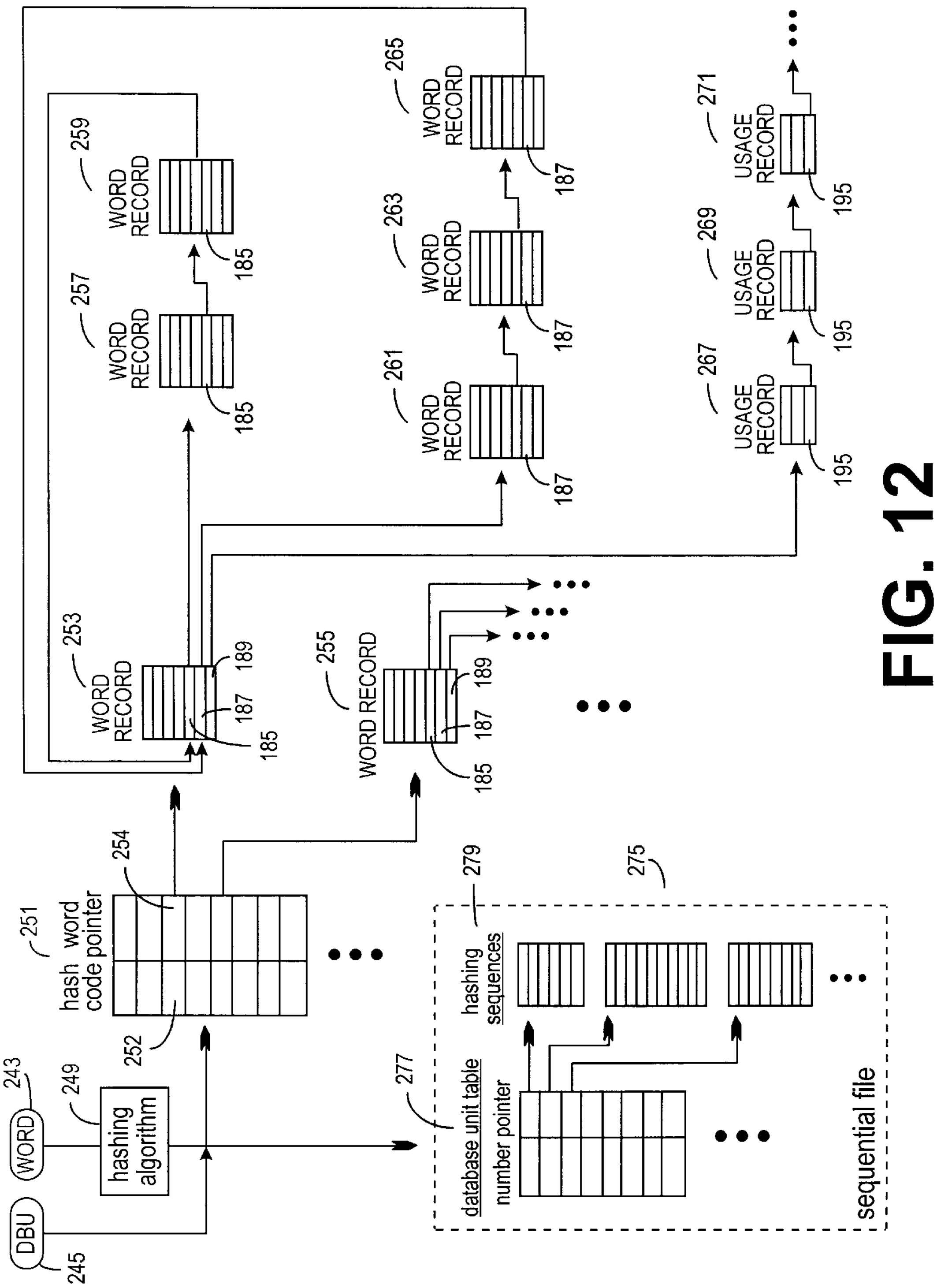
FIG. 12 is a detailed diagram representing the database indexing structure of the present invention which provides a backward index into the actual text stored in the database to be searched.

FIG. 11 is a detailed diagram representing the association of data fields into the types of data records which are the basic building blocks of the database indexing structure illustrated in FIG. 12 associated with each database of the present invention. Through the use of the data records illustrated, the indexing structure provides the attorney terminals with virtually instant feedback regarding a variety of information such as the location of any word in the associated database to be searched. Although preferably located and managed at the same location as the associated database, the indexing structure might also be located locally for quick access.

In particular, the back-bone of the indexing structure involves word records, such as a word record 173, for associating a variety of information for a given word found in the associated database. In particular, each word record used is assigned to a specific word the text of which is stored in a text field 177.

A current_listing_counter field 179 stores a count representative of the number of database units of the associated database that the word stored in the text field 177 can be found. A grammatical_word_type field 181 stores an indicator of the grammatical word type(s) of the word stored in the text field 177. Grammatical types include nouns, verbs, etc., as well as the "legal" type (described previously). Although not specifically shown, there are a variety of legal types which carry specific information which can be used to locate the exact library in the case law database to be searched. For example, the term duress is associated with grammatical legal type which indicates state law libraries should be searched. Along with setup files indicating that the choice of law state is for example Illinois, the attorney terminals can immediately select the appropriate state law database libraries for searching. Many words have multiple grammatical types. To accommodate them, the field 181 provides storage of an indicator which not only provides multiple type indications, but also provides information regarding the relative frequency of usage of each possible type.

Additionally, a significance number field 184 stores the significance number which provides the searching front-ends of the present invention with an automatic indication of the significance of the word stored in the text field 177. Further detail illustrating exemplary calculations of such significance numbers is provided below in relation to FIG. 13.

For access to alternate conjugate verb forms, a conjugate_text_pointer field 185 is provided. Similarly, a thesaurus_text_pointer field 187 provides access to the text of words relating to the word stored in the text field 177 which might be found in a standard thesaurus. Both the thesaurus and conjugate pointer fields 187 and 189 point to respective circular queues of related word records.

The word records, such as the record 173, also provides a usage_pointer field which points to a linked list of all database units that contain the word stored in the text field 177. Specifically, the usage pointer field 189 points to a linked-list of usage records, such as a usage record 175, which contains: 1) a database unit type field 191 for storing the type of database unit in which the associated word can be found; 2) a database unit pointer field 193 for storing a pointer to the database unit in the actual database where the word can be found; and 3) a next_usage_record_pointer field 195 for identifying the next usage record in the linked-list which, if exists, stores the same information regarding the next usage of the associated word in the database. The current_listing_counter 179 provides the number of usage records in the linked-list.

All new databases, i.e., those containing no words, utilize the same database indexing structure having identical word record entries and layout. Differences only appear as unique sequences are added to the database requiring unique association of the indexing structure with usage records. Therefore, the entire new (clean) database indexing structure can be copied and readily applied to new databases as needed. Similarly, clear database indexing structure can be easily extracted from a current structure in use. Therefore, each database indexing structure is associated with a specific release number which indicates to the attorney the level of completeness that a current version may or may not have.

FIG. 12 is a diagram illustrating the interconnection of the word and usage records of the database indexing structure used by the present invention by both the boolean and natural language searching front-ends. To identify the location of a specific word in a given database or to determine whether the database even contains the word, instead of requiring a complete sequential search through the database, the database indexing structure of the present invention provides such information immediately via indexing without requiring any textual searching.

Specifically, an indexing system as that illustrated is associated with each database to be searched. When, through database selection described previously, a database is selected for searching, the attorney terminal, such as the terminal 15, first gains access to the indexing structure illustrated in FIG. 12 the selected database. The indexing structure for the current transcript is maintained by the CAT system 13 in the transcription database 33. Similarly, the storage and maintenance of the structure may be handled by each attorney terminal or by any other computer at a remote location.

Once access to the indexing structure of the desired search database has been established, the attorney terminal, such as terminal 15 can easily identify whether a specific search word formulated by the attorney using the boolean or natural searching front-ends exists in the database, and, if so, how many times and at what specific locations. To accomplish this, the terminal 15 merely converts the text of search word 243 to a hash code using a typical hashing algorithm 249. The terminal 15 accesses the specific word record corresponding to the hashed search word via hashing array 251. In particular, the terminal 15 utilizes the hash code generated as an index to a word pointer which points to the specific word record at issue. From the word pointer identified, the terminal 15 then locates the desired word record which provides access to all of the information needed to conduct a search. For example, a hash code stored at hash code index 252 of the hashing array 251 provides immediate access to a word record 253 via a word pointer stored in a field 254. Similarly, the attorney terminal might access any other word record stored in the database indexing structure.

Once a specific word record is located, the attorney terminal 15 has immediate access all of the fields stored therein. Particularly, the significance number_field 184, which provides the significance number of the search word boolean or natural language front-end searching. Via the current_listing-counter field 179, the attorney terminal receives an immediate indication as to the number of times if any that the search word exists in the database. As described previously, italics are added to the display of those search words having no usage in the database. Moreover, through the usage-pointer field 189, the word record provides the attorney terminal with the location of a search word in associated the database. For example, the usage_pointer field 189 of the word record 253 provides direct access to a linked-list of usage records 267, 269, 271, etc. Each of these usage records identify the type and location of a single database unit which contains the search word. Another two fields might also be added to provide the exact position of the word in the identified database unit, although not shown. Doing so provides for complete reconstruction of the textual database from the database indexing structure alone, wherein the second field is used as a pointer to the next word usage record in sequential order.

Using the database indexing structure, the attorney terminal 15 can then perform all boolean and natural language functions without actually searching the database. The database indexing structure provides rapid access to all of the information needed to aid the attorney in formulating a search without having to perform any textual scanning type searching.

Also provided without actually searching the database, the indexing structure provides lists of available thesaurus and conjugate "alternate" words which exist in the database to be searched. For example, a circular que of thesaurus type alternate words is provided via the thesaurus text pointers 187 of the word record 253 and word records 261, 263 and 265. Similarly, the conjugate alternate words are provided via the conjugate text pointers 187 of the word record 253 and word records 257 and 259. Although three total words exist in the exemplary conjugate word circular que, no words or as many conjugate forms as may exist may be included. Similarly, more or less thesaurus type alternate words may also be included in the thesaurus circular que. In addition, each word stored in the word records of any such circular que can provide access to all of the others. For example, if instead of selecting the search word stored in the word record 253, the attorney chooses an alternate search word stored in the word record 257, the selection of the conjugate button of the search window (described below) provides access to the alternate words stored in the word records 259 and 253 by merely stepping through the circular que. Each alternate word is presented to the attorney with italics and highlighting where required.

In a preferred embodiment where storage space is not an issue, each database indexing structure provides indexing to nearly all of the possible words used in a given language with associated preset circular ques for conjugates and thesaurus word linkages and significance and grammatical information. This same database indexing structure is used as a default structure for all databases. Only as word usage records are added will the database indexing structure become unique to a corresponding textual database. As each word is added to a preset database structure, the corresponding word record information is updated and new usage records are added in a first out fashion onto the linked-list of usage records via the pointer field 189 of the word record. When preforming the front-end searching functions involving the identification of a given search word which turns out to have never been used, instead of finding a dead-end because of a missing word record, the word record would be located so that potential thesaurus and conjugate word alternatives which have been used could be identified for adoption. Additionally, every occurrence of every word found in the database, no matter how common the word, separate usage record is provided to identify each such usage instances.

If storage space is of concern, only those word records which have been used are added as they are needed to the database index structure of the database at issue. However, doing so will tend to minimize the functionality of the thesaurus and conjugation buttons. An alternate storage space saving approach would be to disregard all extremely common words such as "the" "a", etc., by not storing any usage records for these words at all. Instead, the significance number of the associated word record storing the extremely common word would indicate to the attorney terminal that the actual positions are not available. To determine whether to save such usage records, the significance number could be compared to a third threshold level set low enough to strip out only the most insignificant of all possible words. The third threshold could be adjusted to pare-down the size of the database index structure.

Another way of paring-down the storage size of the database indexing structure is to only allow a single usage record to be added for any word record for any one database unit. In other words, no matter how many times the word "the" occurs in a single database unit, only one usage record is permitted to be added to the word record corresponding to the word "the".

As mentioned previously, by adding additional fields to the usage record, a sequential linkage of all words in the textual database can provide for easy reconstruction of the textual database counterpart. In fact, the counterpart itself may never be needed. Similarly, instead of extracting text from a remote location, the hashing codes might instead be transmitted. As long as a copy of the same preset database indexing structure exists on the sending and receiving end, the actual text can be easily be reconstructed for display. In addition, because of the inherent compression occurring with the hash code length versus the text length, the speed of data exchange can be increased dramatically. Similarly, the size of the files will decrease. Estimates indicate that at least a three to one (3:1) compression factor can be easily achieved.

In one embodiment of the present invention, as the preset database indexing structure is personalized, i.e., words are added thereto, a sequential hash code file 275 is created from which transmissions may originate. The sequential file 275 consists of a database unit number table 277 which provides access to a series of associated hash code sequences 279 for sequentially storing the hashing code for each word used in the database. Specifically, to create, for example, a new transcript file, the CAT system 13 (or any attorney terminal) provides an indication of first database unit, a question #1 (Q1), at the block 245. Thereafter, each word transcribed for Q1 is sequentially provided via a block 243 to a typical hashing algorithm at a block 249. A hash code for each word is thus generated.

The database unit number, Q1, is added to the database unit table which assigns a pointer to an individual hashing sequence of the sequences 279 which begins to sequentially store each hash code generated therein. Whenever the database unit changes as indicated via the block 245 for example to the first answer (A1), a new entry in the table 277 is made which provides access to a new storage space for the next series of hash codes via another hashing sequence in the sequences 279.

At the same time, each hash code generated and database unit indicator is used to add a usage record to the appropriate word records. In particular, the hash code generated is indexed into the hashing array 251 which provides a pointer to the specific word record of the current word. Once the word record is located, the current_listing_counter 179 therein is incremented to indicate the new usage. Also, a new usage record is created by storing both the database unit number via the indicator provided at the block 245 in the pointer field 193, and the database unit type also provided via the block 245 in the type field 191. The usage record is thereafter added to the linked-list of usage records associated with that word record.

To accommodate words not found in the hashing array 251: 1) the hashing code for the new word is added as a entry in the hashing array 251; 2) a new word record is created for the new word and the pointer there to is placed in the word pointer field associated with the new hash code of the hashing array 251; 3) the text of the new word is inserted into the text field 177 of the new word record; and 4) the significance number stored in the field 184 of the new word is set to the maximum significance level because of its uniqueness. Additionally, instead of saving the new hashing code alone in the sequential file 275, an escape sequence character is placed in the hashing sequence 279 followed by the actual text of the new word and a closing escape sequence character. In this way, the text of new words is directly included in the hash code sequence of the sequential file 275 so that any recipient can reconstruct the full text using only a clean, preset database indexing structure along with sequential file 275. Also, the sequential file 275, or any portion thereof via database unit table 277 look-up, can be rapidly transmitted into the environment of a second database indexing structure for reconstruction of the word text in whole or in part. Inherent compression also adds to these benefits. Moreover, by retrieving as many sequential files, such as the file 275, as possible, the new words encountered can be used as a basis for building an even more complete preset database structure that can then be redistributed, providing better indexing coverage.

FIG. 13 is a diagram representing an approach used by the present invention to construct the significance number for a given word found in the present invention. Although more complex schemes may be used which take into account actual grammatical usage in the sentence context, the amount of overhead associated therewith (in response time and CPU dedication) to obtain a "better" significance valuation may not be justified. This is not only because of the relatively small benefit added, but also, in view of the interactive nature of the front-end tools provided by the present invention, the potential benefits have little impact on the attorney's ability to locate a desired search.

As illustrated, the significance number is generated considering both the grammatical type and commonality of a given word. Words which are very are common are less likely to be desirable for identifying a specific database unit out of the many recorded in an entire database. Similarly, grammatical word types which only provide syntax support in a language such as an article, whether common or not provided little interest in the identification of a desired database. Therefore, when combined, the commonality and grammatical type of a word offers a very good indication as to the significance of a word for a given search.

Specifically, the significance number used in an embodiment of the present invention ranges from zero (0) to one hundred (100) which results in a combination of offset values generated from an offset table 301 and the statistical commonality of the word as illustrated in exemplary listing of sample offsets 303. For example, the term "duress" has grammatical word type "legal" as indicating by the type field 305 as having an offset value of fifty (50). Because the term is also considered uncommon statistically as represented in a description field 327, an offset value of forty (40) is added to provide a total significance number of ninety (90). Similarly, the article "the" is extremely common, thus, via a type field 321 and a description field 337, a significance number of fifteen (15) is generated. New words encountered which have not been grammatically typed are considered extremely uncommon and automatically given a maximum significance number of one hundred (100). As described below, this ensures that not only will the word be easily recognized as new, but also the word will receive appropriate highlighting (red) indicating the highest significance to the attorney during searching.

As previously described, the present invention operates using a first threshold to classify a word that has a higher significance than other words. The first, higher threshold value is set at a significance score of eighty (80) as a default. When displayed in the searching windows, search words having a significance number of eighty (80) or greater receive red highlighting. Similarly, the lower significance number range for receiving blue highlighting involves a second threshold value of sixty (60). Therefore, a word with a significance number of greater than sixty (60) but less than eighty (80)receives blue highlighting. All words having significance numbers less than sixty (60) receive no highlighting, and are classified as insignificant. Such words are not considered in any searching formulations unless manually overridden by the attorney as previously described.

If the conjugate or thesaurus buttons are selected, the alternate words located via the respective circular queues in the database indexing structure provide grounds for alternate significance highlighting calculations. Specifically, the significance number of the most common alternate word is used as the significance number for providing a possibly blue highlighting color instead of red for the selected word. This simple scheme works well with only two levels of highlighting but may be modified to provide for situations in which a multitude of other colors are involved. In such situations at least blue highlighting at a minimum is displayed even if the second threshold-is not met, because the mere selection of word alternates indicates that the attorney considers the words to be important in the search. In addition, the significance number might be adjusted based on the current database usage, but is not preferred for similar reasons.

Additionally, although the features associated specifically with searching are shown only in the context of a legal proceeding, they are also contemplated to operate in other pre or post proceeding situations to aid the attorney's searching.

Although circular queues and linked-list are preferred, the present invention contemplates many database structural modifications which might be made to the embodiments disclosed herein. Similarly, the flow and operation described above is merely an embodiment of the many possible ways of carrying out the specific objects of the present invention. It is obvious that the embodiments of the present invention described hereinabove are merely illustrative and that other modifications and adaptations may be made without departing from the scope of the appended claims.

We claim:

1. A computing system used during a proceeding in which real-time transcript of spoken words is generated, said computing system comprising:

a screen;

a processing circuit communicatively coupled to said screen;

said processing circuit producing in real-time an index that corresponds to the spoken words from real-time transcript as it is generated; and said processing circuit using the index to support real-time searching.

2. The computing system of claim 1 wherein said processing circuit causes the display on said screen of an indication of a number of hits in response to a search request made during generation of the real-time transcript.

3. The computing system of claim 1 wherein said processing circuit directs the display on said screen of text for a non-searching reason, and further comprising a user interface for permitting an attorney to manually select at least a portion of the text displayed for the non-searching reason and to initiate a search by said processing circuit of the real-time transcript generated using the selected text.

4. The computing system of claim 1 wherein the real-time searching gives higher priority to words of low occurrence.

5. The computing system of claim 1 wherein the real-time searching screens words of high occurrence.

6. The computing system of claim 1 further comprising:

a transcription system that generates the real-time transcript;

an attorney terminal communicatively coupled to the transcription system to receive the real-time transcript as it is generated, said attorney terminal comprising the screen, the processing circuit, and a user interface that accepts a search request;

said processing circuit responding to the search request during generation of the real-time transcript by referencing the index;

said processing circuit utilizing the referencing of the index to identify a portion of the real-time transcript; and said processing circuit directing the display on said screen of the identified portion of the real-time transcript.

7. The computing system of claim 6 wherein said processing circuit directs display on said screen of an indication of a number of hits determined from the referencing of the index.

8. A computing system used during a proceeding in which a transcript representative of spoken words is generated in real-time, said computing system comprising:

a transcription system that generates transcript in real time;

an attorney terminal communicatively coupled to the transcription system to receive the transcript, said attorney terminal comprising a screen, a processing circuit, and a user interface that accepts a first search request during generation of the transcript in real-time; and said processing circuit directing, during generation of the transcript in real-time, display on said screen of at least a portion of the transcript corresponding to results of the first search request.

9. The computing system of claim 8 wherein said processing circuit generates an index that corresponds to the spoken words of the transcript in real-time.

10. The computing system of claim 9 wherein said processing circuit utilizes the index to identify an indication of a number of hits prior to displaying the at least portion of the transcript corresponding to the results of the first search request.

11. The computing system of claim 8 wherein said processing circuit directs the display on said screen of text for a non-searching reason, and said user interface for permitting an attorney to manually select at least a portion of the text displayed for the non-searching reason as a second search request.

12. A method performed by a computing system during a transcription proceeding, the method comprising:

converting representations of spoken words to a textual format in real time;

adding occurrence indications for at least a portion of the spoken words in the textual format to an index in real-time; and referencing the index to identify at least one of the occurrence indications in performing a search in real-time during the transcription proceeding.

13. The method of claim 12 further comprising displaying on a screen the at least one occurrence indication in response to the search.

14. The method of claim 13 further comprising selectively displaying on the screen, subsequent to the displaying on the screen of the at least one occurrence indication, at least one of the spoken words in the textual format that corresponds to the at least one occurrence indication.

15. The method of claim 12 further comprising treating those of the spoken words in the textual format that occur relatively less frequently with relatively higher significance in performing the search.

16. The method of claim 12 further comprising screening those of the spoken words in the textual format occurring relatively more frequently while performing the search.

17. A method performed by a computing system during a transcription proceeding, the method comprising:

converting representations of a first occurrence of a spoken word to a textual format in real time;

indicating an occurrence of the spoken word in the textual format in an index in real-time;

converting representations of subsequent occurrences of the spoken word to the textual format in real-time;

indicating the subsequent occurrences of the spoken word in the textual format in the index in real-time.

18. The method of claim 17 further comprising using the index in performing a search during generation of the transcript in real-time.

19. The method of claim 18 further comprising displaying on a screen a number of hits by referencing the index in response to the search.

20. The method of claim 19 further comprising selectively displaying on the screen, subsequent to the displaying of the number of hits, search results.

21. The method of claim 17 further comprising considering a number of occurrences of the spoken word in the textual format in performing a search.

* * * * *